Aug. 30, 1966

A. G. BODINE 3,269,039

SONIC EARTH MOVING MACHINE

Filed Nov. 27, 1963

INVENTOR.
ALBERT G. BODINE,
BY
ATTORNEY.

Aug. 30, 1966  A. G. BODINE  3,269,039
SONIC EARTH MOVING MACHINE
Filed Nov. 27, 1963  11 Sheets-Sheet 2
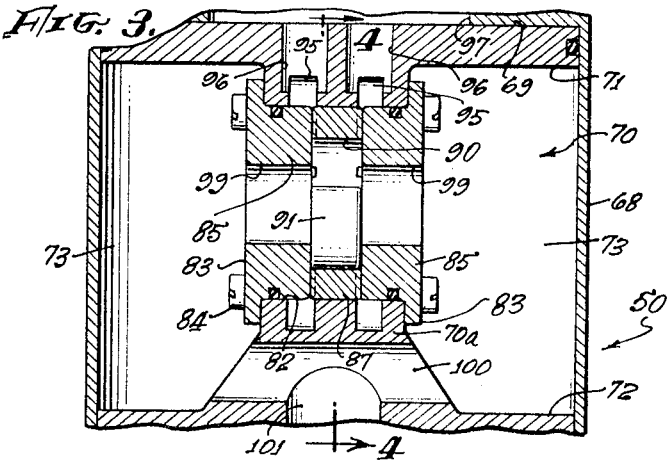
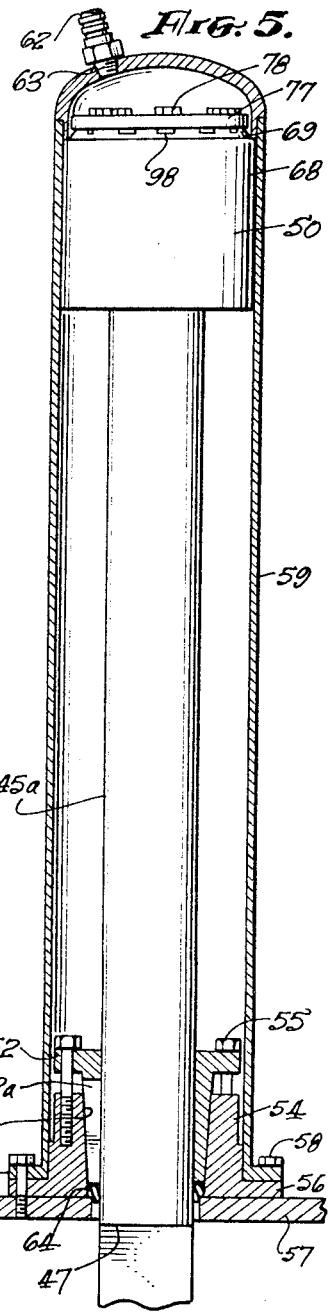
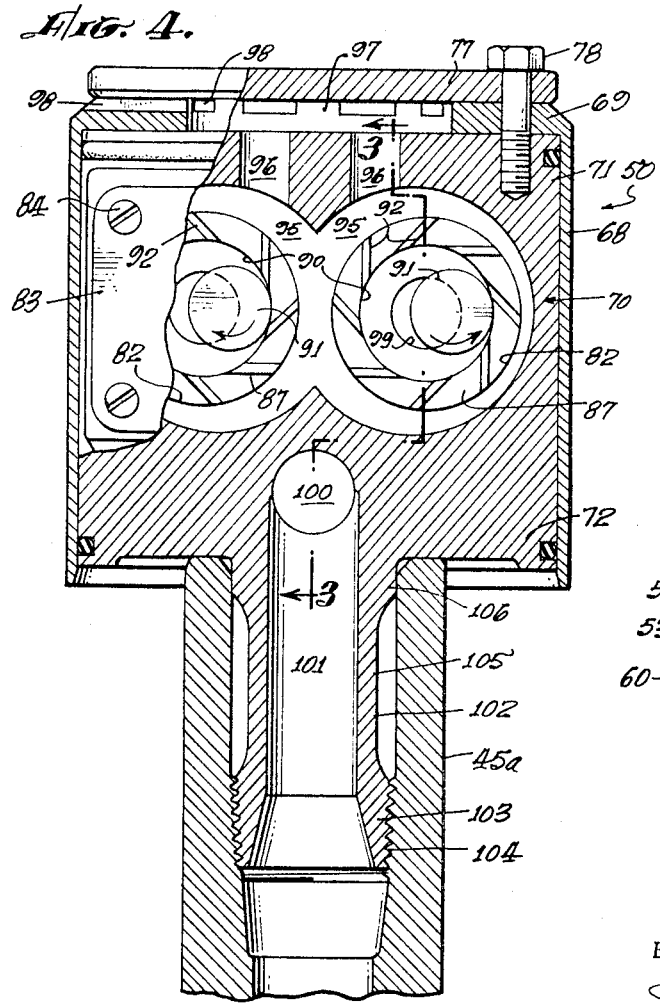
INVENTOR.
ALBERT G. BODINE,
BY
ATTORNEY.

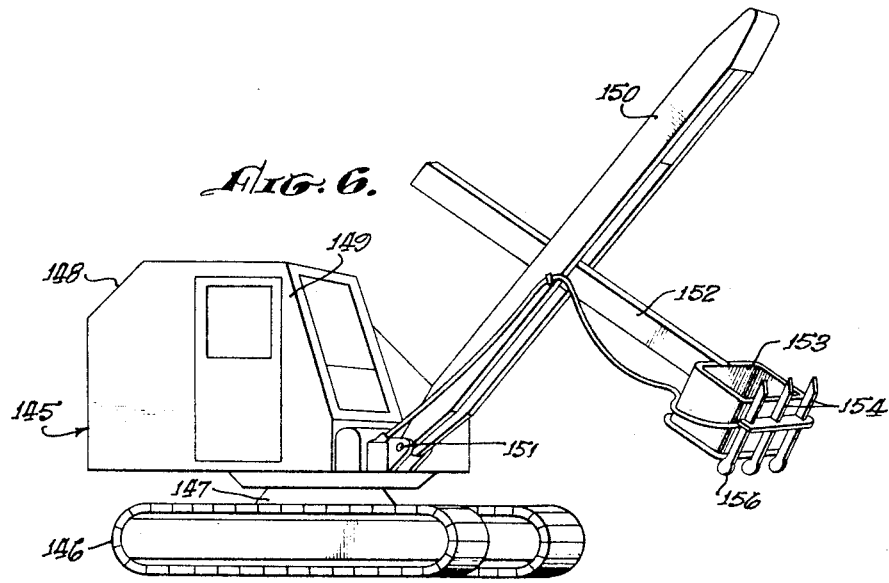
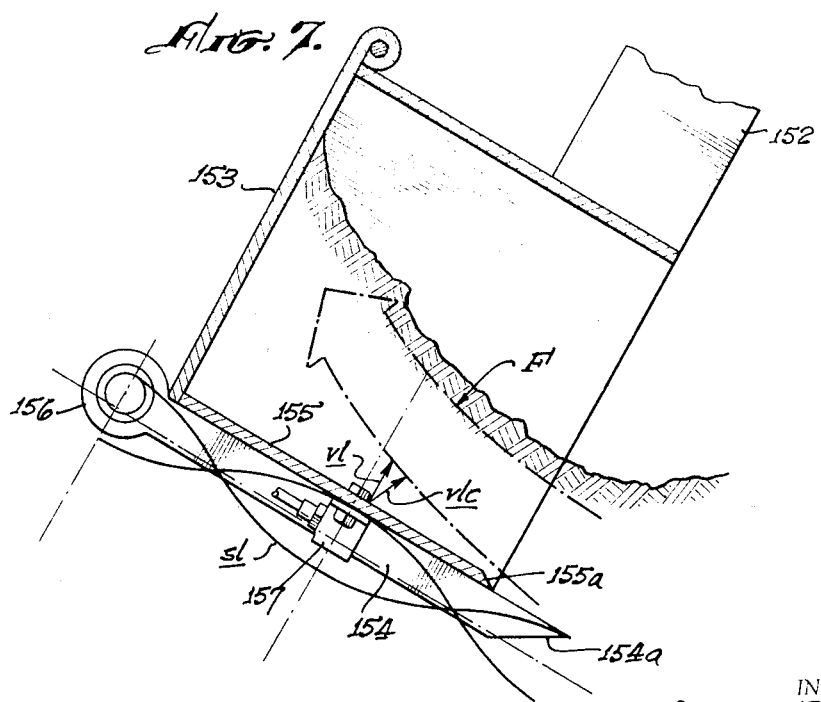

Aug. 30, 1966 A. G. BODINE 3,269,039
SONIC EARTH MOVING MACHINE
Filed Nov. 27, 1963 11 Sheets-Sheet 4
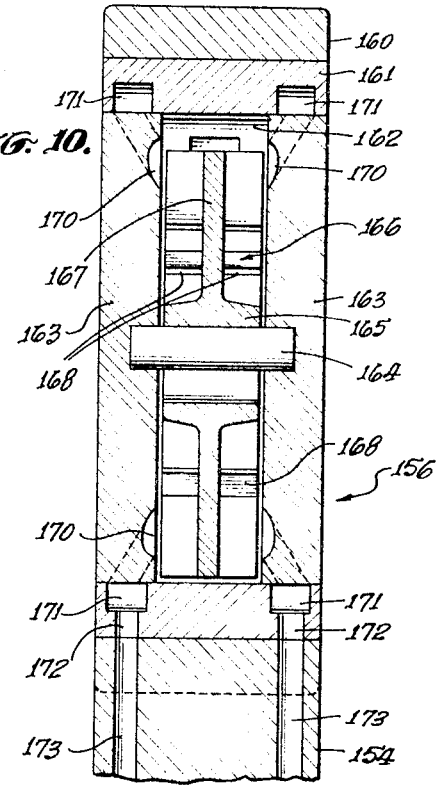
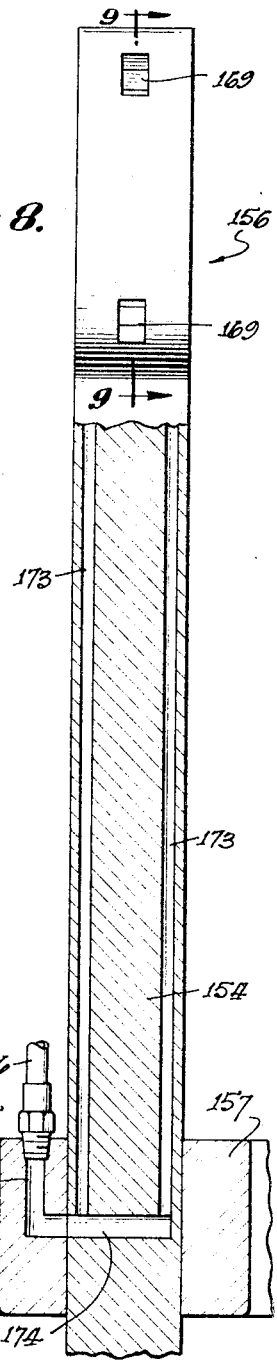
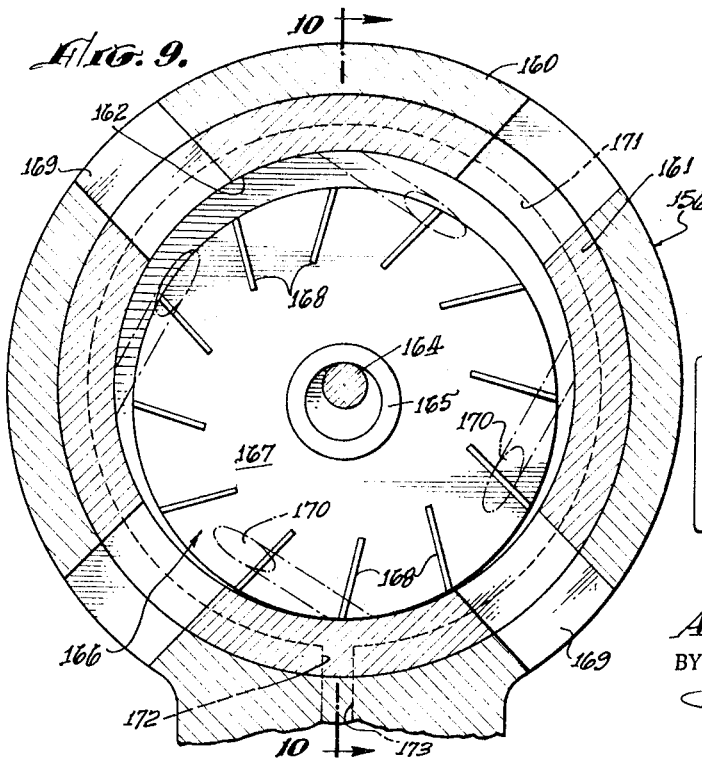
INVENTOR.
ALBERT G. BODINE,
BY
ATTORNEY.

Aug. 30, 1966 A. G. BODINE 3,269,039
SONIC EARTH MOVING MACHINE
Filed Nov. 27, 1963 11 Sheets-Sheet 5
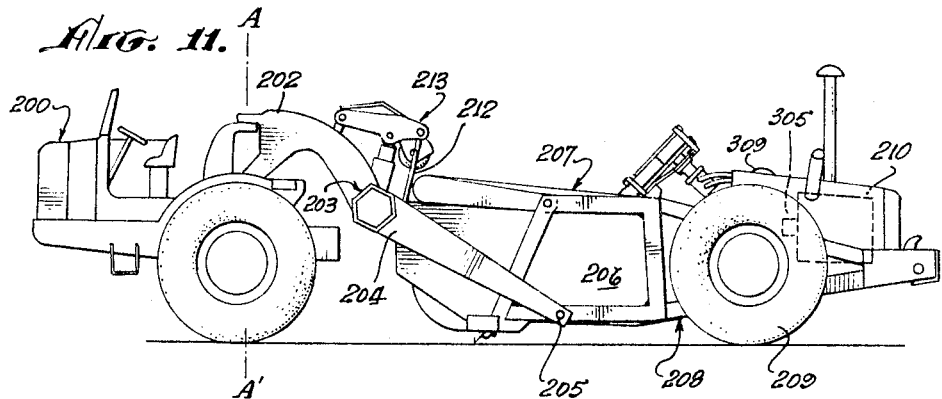
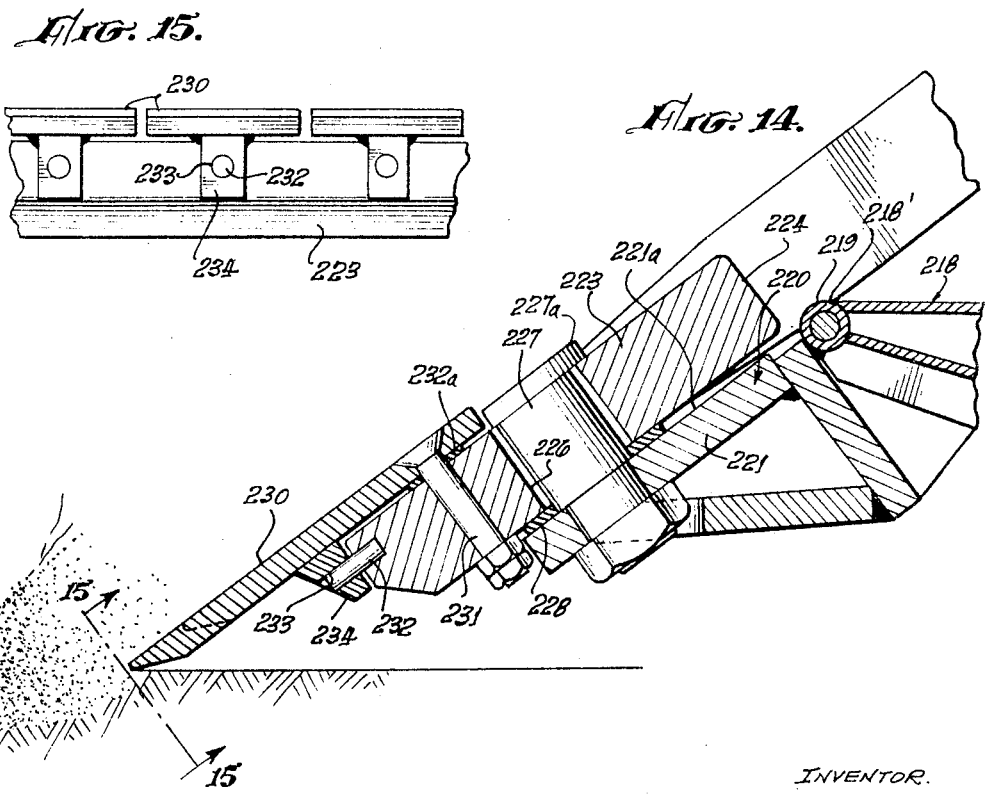
INVENTOR.
ALBERT G. BODINE,
BY
ATTORNEY.

Aug. 30, 1966　　　A. G. BODINE　　　3,269,039
SONIC EARTH MOVING MACHINE
Filed Nov. 27, 1963　　　11 Sheets-Sheet 6
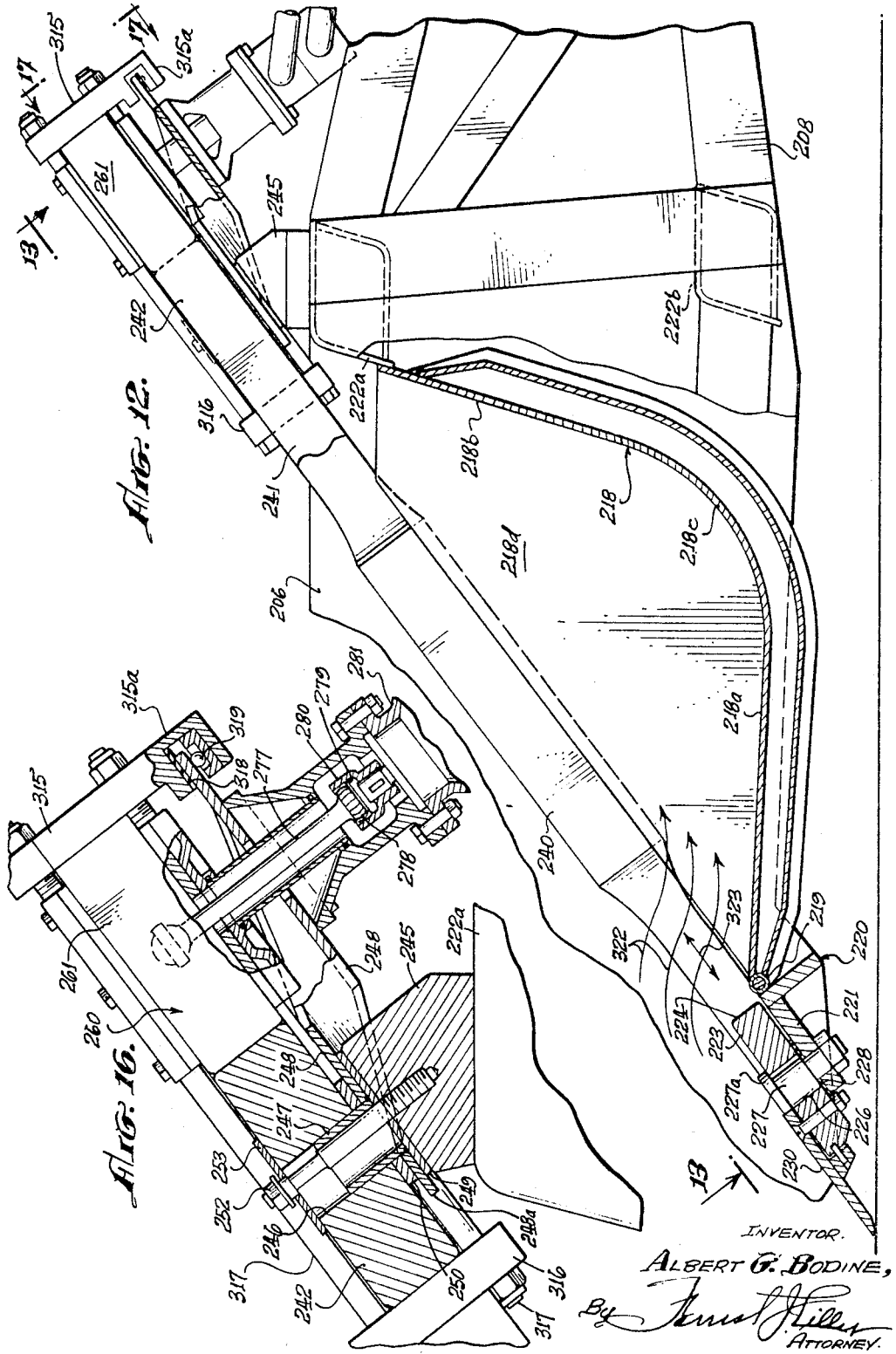

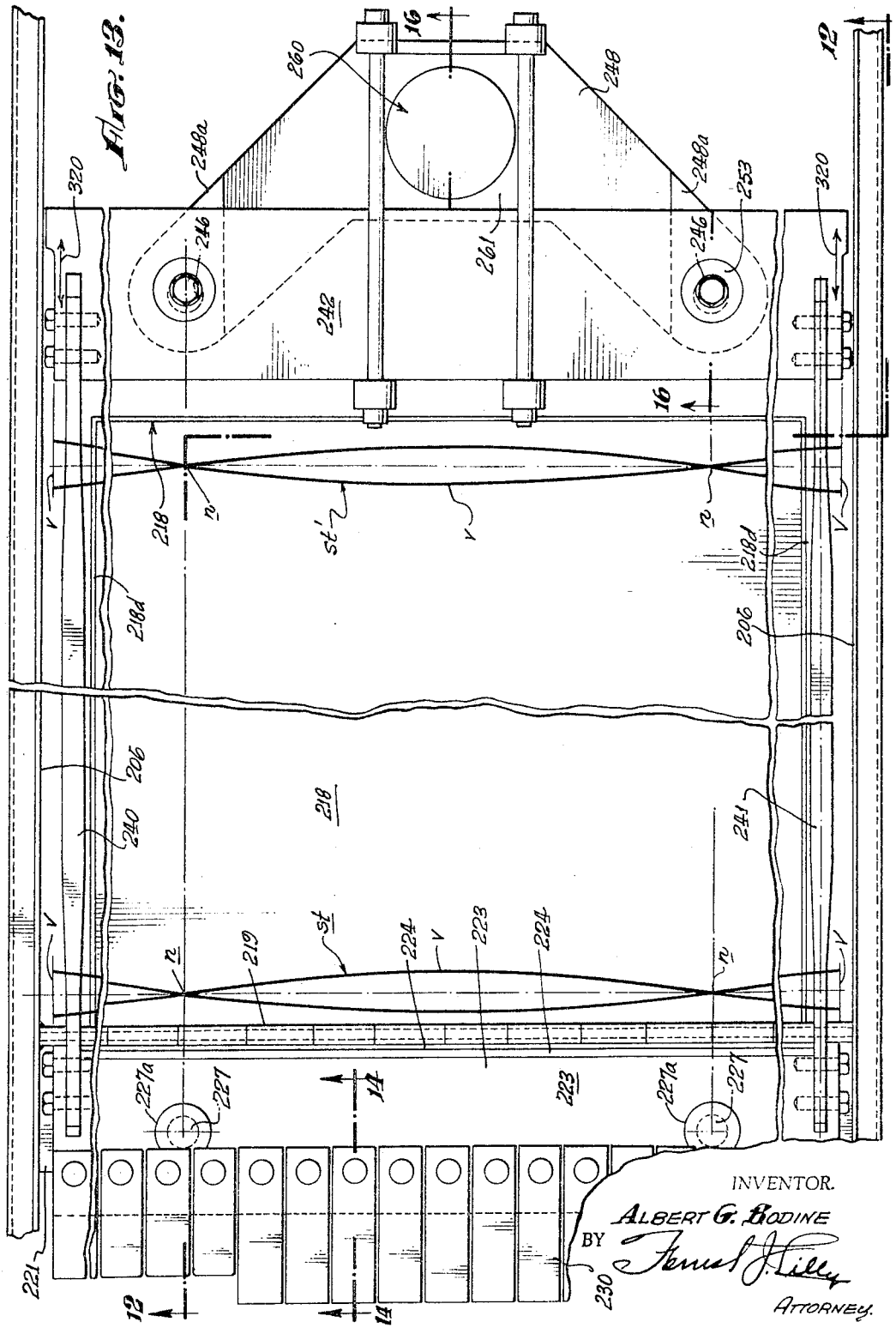

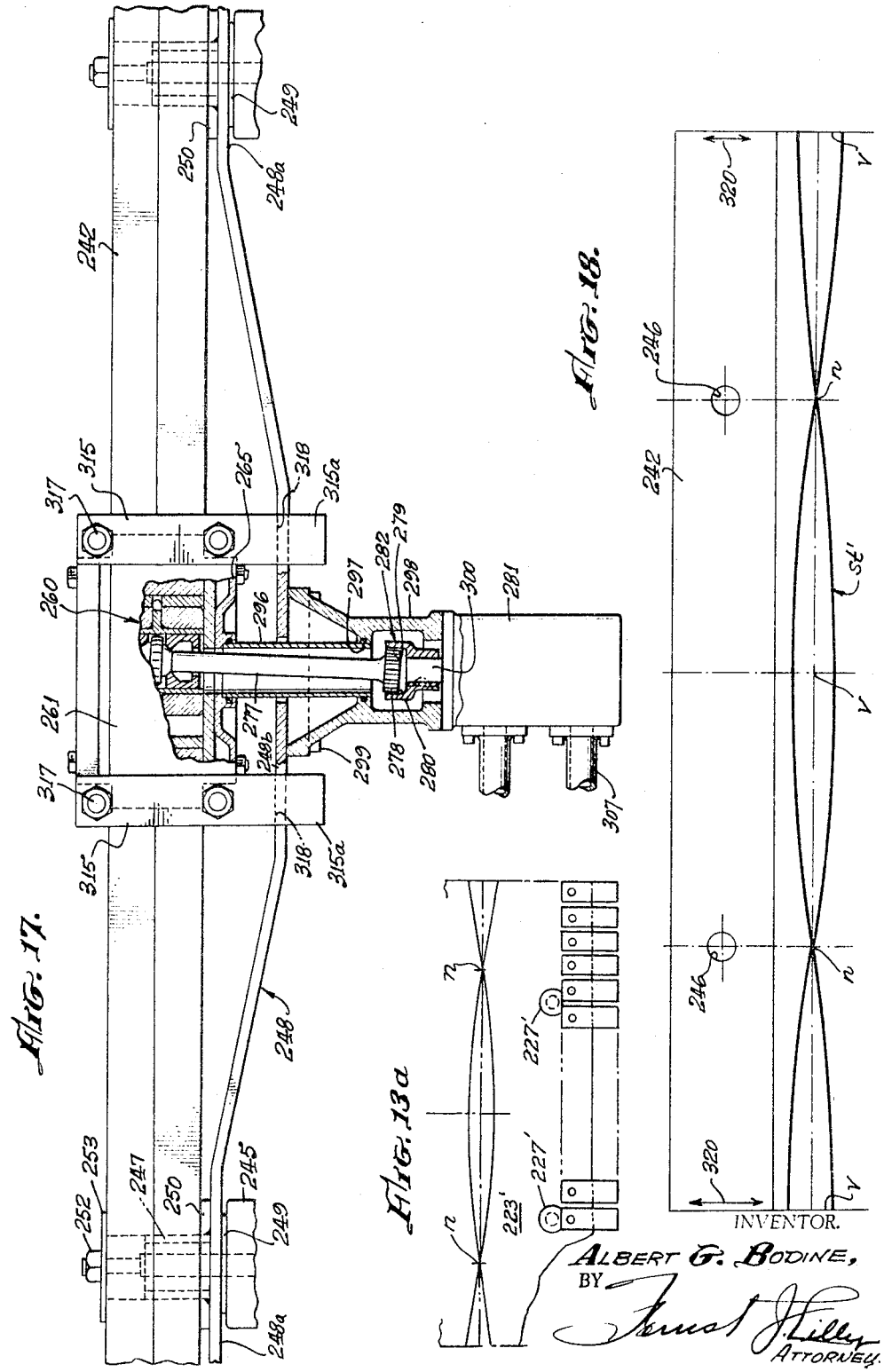

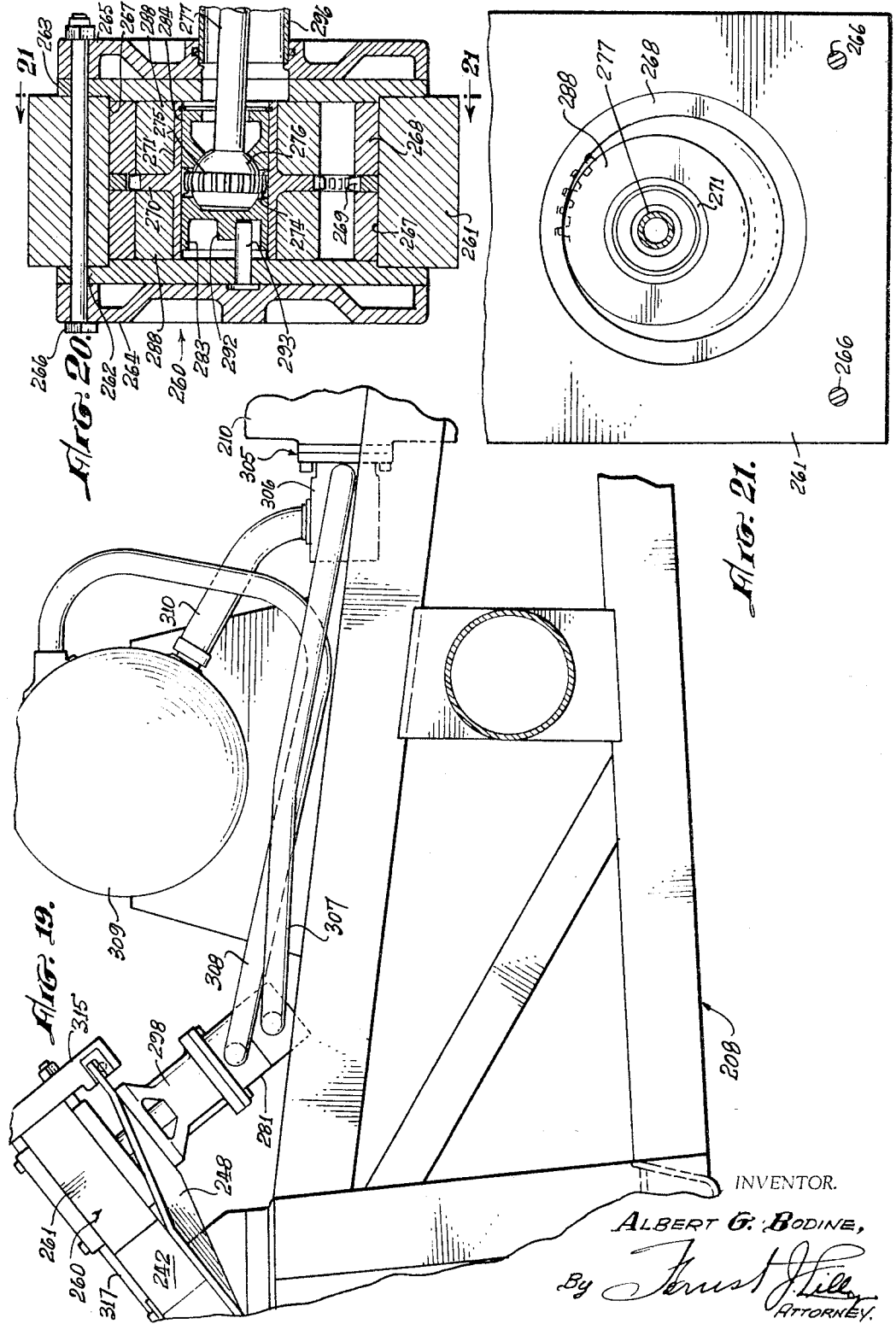

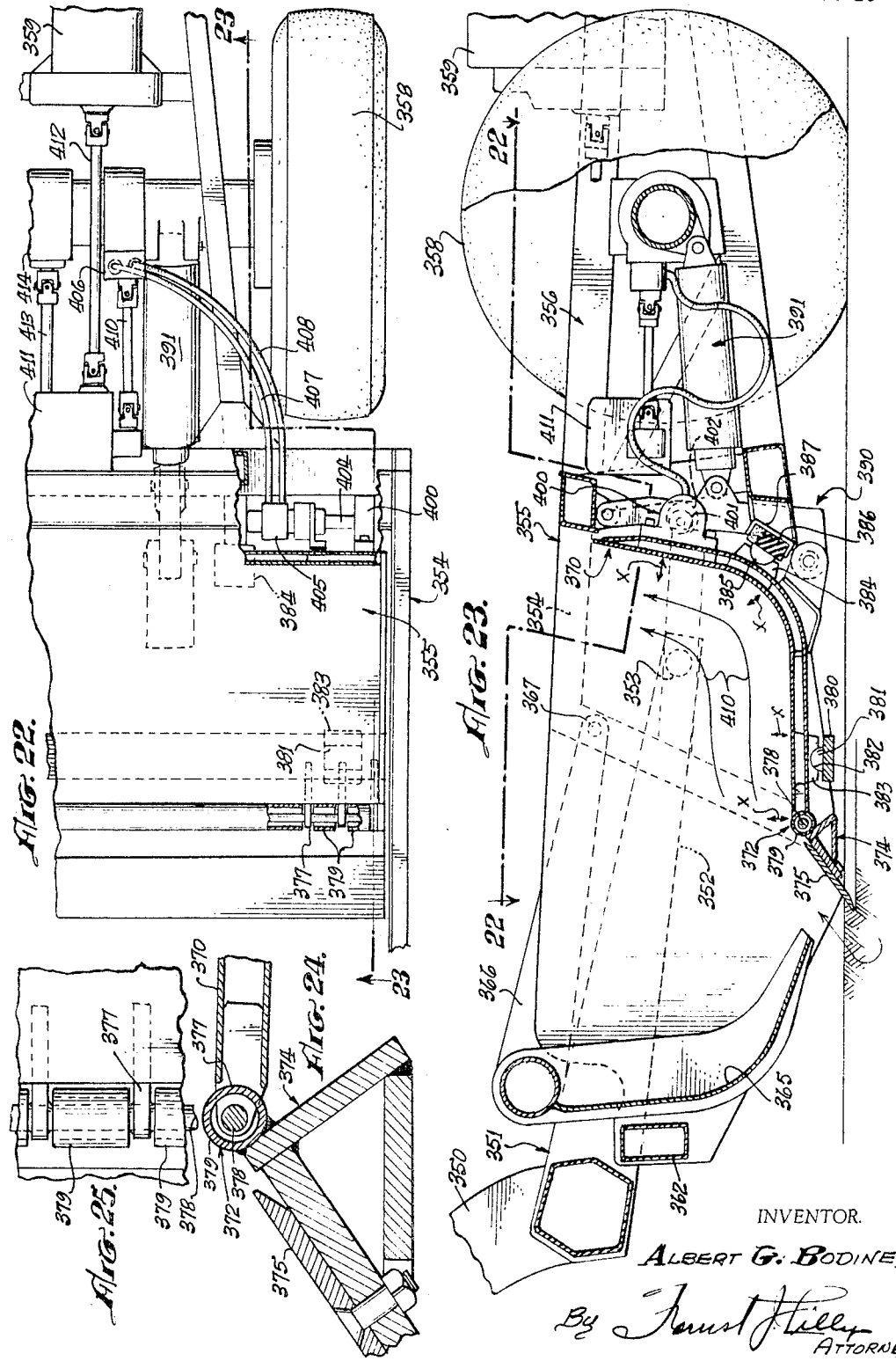

Aug. 30, 1966
A. G. BODINE
3,269,039
SONIC EARTH MOVING MACHINE
Filed Nov. 27, 1963
11 Sheets-Sheet 11
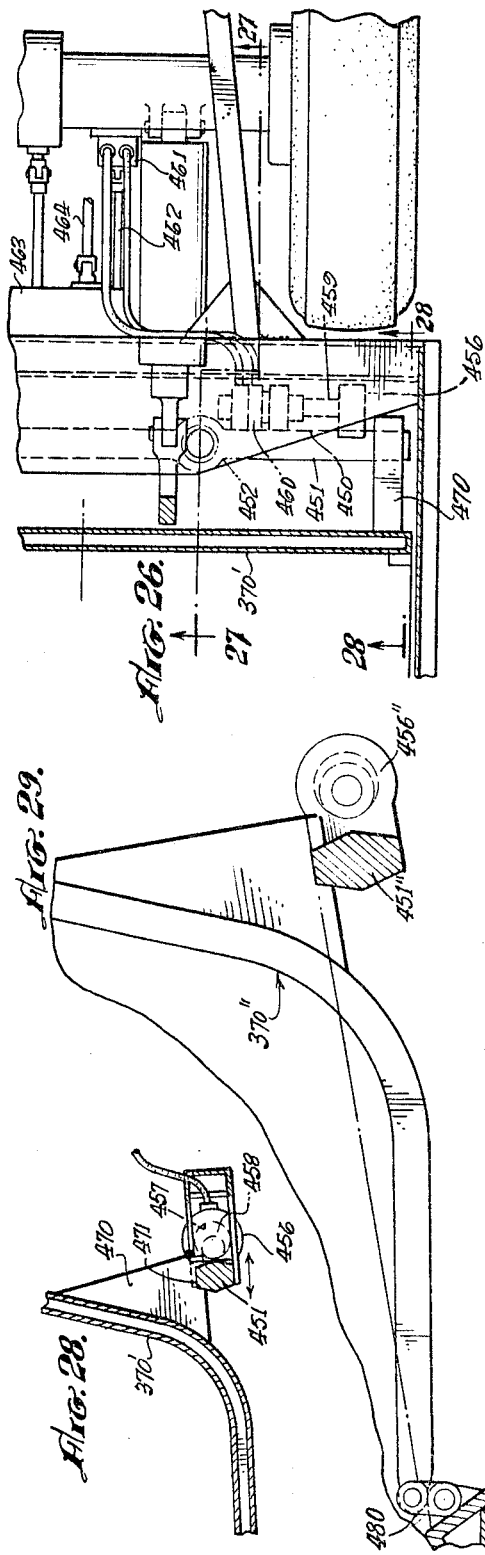
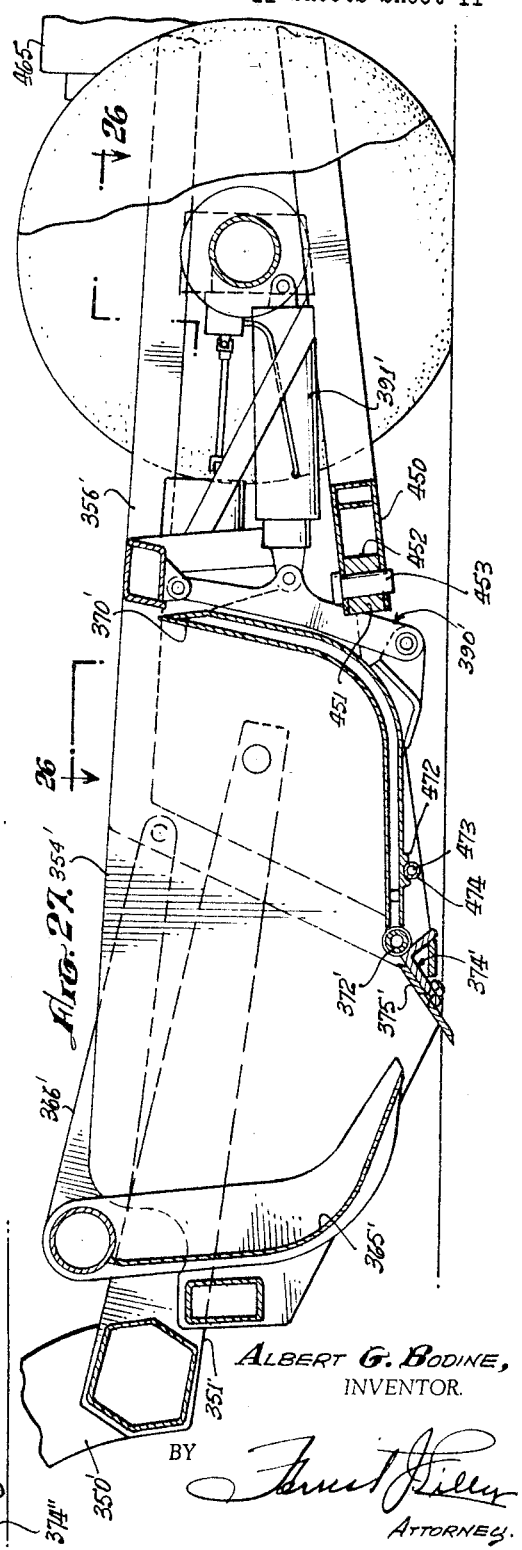
ALBERT G. BODINE,
INVENTOR.
BY
ATTORNEY.

United States Patent Office 3,269,039
Patented August 30, 1966

3,269,039
SONIC EARTH MOVING MACHINE
Albert G. Bodine, Los Angeles, Calif.
(7877 Woodley Ave., Van Nuys, Calif.)
Filed Nov. 27, 1963, Ser. No. 326,419
5 Claims. (Cl. 37—126)

This application is a continuation-in-part of my copending application entitled, Sonic Wave Earth Crushing, Digging and Moving Machines, filed January 2, 1962, Serial No. 163,802, which was a division of my parent application of the same title, Serial No. 839,196, filed September 10, 1959, now Patent No. 3,030,715. This invention relates generally to earth moving processes and machines such as scrapers, dozers, shovels, etc., and its general object is to provide sonic means and methods for facilitating the movement of earth by and into such means.

Machines of the type in contemplation have a blade, bowl, shell or bucket relative to which earth material which is to be moved or loaded has a region or path of flow. The machine, by virtue of its geometric configuration and its inherent mode of operation, thus has a predetermined "earth flow region." This is the region wherein, during operation of the machine, the loose earth material flows over the blade, or the lip of the bowl, shell or bucket, as the case may be, with emphasis particularly on large zones or areas which may be definitely spaced from the surface of the blade, bowl, shell or bucket. One of the problems in loading dirt into a bowl, shell or bucket, or of crowding up a mound of dirt in front of the blade of a dozer, results from the large friction of new layers of dirt climbing over layers stacked up. Friction within the flowing dirt, rather than friction of dirt on blade, bowl, or the like, is thus one of the principal problems of present interest. The flow region of the machine wherein this phenomenon occurs, i.e., dirt moving on dirt, is the principal problem site to which one aspect of the present invention is primarily directed.

One general object of the invention is accordingly to provide methods and means for reducing the dirt-on-dirt and other frictions in the earth flow region of the machine, so as to improve flowability of the earth material therethrough.

In accordance with the invention, in one broad aspect, powerful sonic vibrations are radiated or transmitted through the earth material, as a propagation medium, into the earth material flowing through the described "earth flow region" of the machine, with the consequence that the earth material moving through this region is sonically agitated and activated in response to such vibrations, and thereby fluidized or rendered mobile such that it runs easily, and with greatly reduced friction, either up the incline of previously stacked dirt, or over such stacked dirt and up and back into a scraper bowl or shell, the bucket of a shovel, or the like.

I have found that sonic vibrations of large intensity radiated into or transmitted through the earth material, as a propagation medium, in the "earth flow region" of the machine, tends to fluidize and activate the material in said region and thereby to enhance its flowability, and it is a feature of the invention that the earth material be so sonically treated in the earth flow region of the machine. A more specific feature of the invention is an orientation of the sonic vibration through the earth material so as to provide a component of vibration of earth material in a discussion transversely of the direction or path of earth flow in the earth flow region of the machine. Thus, to give a specific example, I may create lateral elastic vibrations in a wall of a bowl or loading shell of a scraper or the like, such as in the so-called "ejector" of a common type of scraper, with the consequence that the laterally vibratory front and more nearly horizontal portion of said wall acoustically couple to the generally horizontally flowing dirt above it, and radiates sonic vibrations upward through said dirt, across or normal to the dirt flow path in this part of the flow region of the bowl. At the same time, the more nearly vertical rearward wall portion of the ejector acoustically couples to the dirt as the latter rises or builds up upon it, and having a component of vibration normal to its dirt contacting coupling surface, radiates sonic vibrations generally horizontally and normally to the dirt flow path in this part of the flow region of the bowl. The rearward wall portion of the ejector also radiates sonic vibrations in a generally horizontal direction and with a horizontal component of vibration such as are propagated to and traverse the horizontally oncoming dirt in the first part of the earth flow region. In certain cases, usually preferred, the horizontal front portion of the ejector also has a component of vibration parallel to its surface, which acoustically couples in shear to the dirt directly over it, so that lateral or shear type sonic vibrations are transmitted upwards through the dirt above. Also, the back of the ejector will in such case ordinarily also have a component of vibration parallel to its surface, and, being shear coupled to the dirt thereagainst, results in the radiation of lateral or shear type sonic vibrations which are transmitted across or through the earth flow region, reaching not only the rising part of the flow path, but the more horizontal entrance part as well.

The described sonic vibration transmission through the earth material passing through the flow region of the machine results in a high acceleration type of vibration within the flowing earth media, causing it to become agitated and to become capable of flow almost like a liquid.

Referring again to the preferred and illustrative use of lateral elastic vibrations in the "ejector" of a scraper, for example, it is here noted that propagation of sonic vibration through the earth material in the flow region is greatly facilitated by the use of such lateral vibrations. The earth material in the earth flow region is of low compaction, and low bias pressure. It is therefore an acoustic vibration transmission medium of low impedance. A wall, such as the ejector wall, vibrating in a lateral mode, is an acoustic source of low impedance; and the low impedance laterally vibratory wall is then well matched to the low impedance of the earth in the earth flow region, so that good transmission of vibratory sonic power from the ejector to the earth materal in the flow region is thereby accomplished.

Another accomplishment of the invention is that the sonic activity in the flow region of the machine, where the bias pressure is low, has a desirable capability of breaking up and granulating clayey type earth materials, so that flowability is further promoted.

Another illustrative embodiment of the invention involves an elastic bar positioned transversely across the entrance edges or lip of a bowl, shell or "ejector" of a scraper, bucket or other earth loading machine, together with means for setting such bar into lateral mode of resonant elastic standing wave vibration. This vibrating bar couples to the earth material moving over it, and acts particularly on the dirt moving up the incline in back of the entrance edge or lip of the bowl. This vibratory bar can also, optionally, carry a scraper blade means, for example, in the form of a multiplicity of earth engaging teeth, which are thereby vibrated against the earth to make the desired cut, or to facilitate the desired scraping operation.

The invention includes a number of additional forms and features, which will be left for description in the body of the specification. Referring now to the drawings:

FIG. 3 is a sectional view of the vibration generator of FIGS. 1 and 2, taken on broken line 3—3 of FIG. 4;

FIG. 4 is a sectional view taken on broken line 4—4 of FIG. 3;

FIG. 5 is a view similar to a portion of FIG. 2, with mounting arrangements for the vibratory bar shown in section;

FIG. 6 shows a power shovel equipped with improvements in accordance with the invention;

FIG. 7 is a longitudinal sectional view through the bucket and vibratory bars of the shovel of FIG. 6;

FIG. 8 shows the rearward half portion of one of the vibratory bars of FIGS. 6 and 7, with portions broken away to show underlying structure in section;

FIG. 9 is a section taken on line 9—9 of FIG. 8;

FIG. 10 is a section taken on line 10—10 of FIG. 9;

FIG. 11 is a somewhat diagrammatic side elevational view of a conventional type of power scraper to which has been added improvements in accordance with the present invention;

FIG. 12 is a vertical section taken on the broken line 12—12 of FIG. 13 and showing the ejector of the scraper bowl in longitudinal section, the scraper blade means, and certain improvements in accordance with the invention;

FIG. 13 is a view taken on line 13—13 of FIG. 12;

FIG. 13a is a diagrammatic view, similar to FIG. 2, showing a modification;

FIG. 14 is a section taken on line 14—14 of FIG. 13;

FIG. 15 is a section taken in accordance with line 15—15 of FIG. 14;

FIG. 16 is a section taken on broken line 16—16 of FIG. 13;

FIG. 17 is a view taken in accordance with the line 17—17 on FIG. 12;

FIG. 18 is a diagrammatic view of an elastic vibratory bar and showing alongside thereof a standing wave pattern exhibited by said bar;

FIG. 19 is a view constituting a rearward continuation of FIG. 12;

FIG. 20 is a view similar to a portion of FIG. 16, confined to the oscillator, and showing the same in medial section;

FIG. 21 is a section taken on line 21—21 of FIG. 20;

FIG. 22 is a plan view of a portion of a scraper equipped with improvements in accordance with the invention, the view being taken in accordance with broken line 22—22 of FIG. 23;

FIG. 23 is a section showing a portion of a scraper equipped with improvements in accordance with the invention, being taken on broken line 23—23 of FIG. 22;

FIG. 24 is a detail taken from FIG. 23 and shown to an enlarged scale;

FIG. 25 is a detail to an enlarged scale of a portion of the hinge means seen in FIG. 22;

FIG. 26 is a plan view of a portion of a scraper equipped with modified improvements in accordance with the invention, being taken on broken line 26—26 of FIG. 27;

FIG. 27 is a view taken in accordance with line 27—27 of FIG. 26;

FIG. 28 is a detail section taken on line 28—28 of FIG. 26; and

FIG. 29 is a view of an ejector and ejector mounting, similar to a portion of FIG. 27, but showing a modification.

Figure 1:
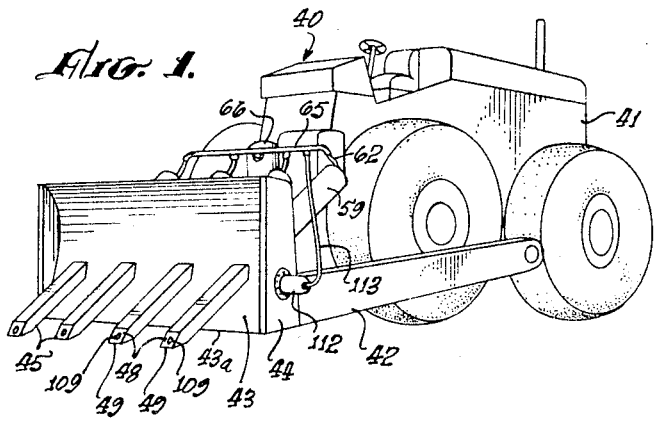
FIG. 1 is a perspective view of a conventional type of dozer equipped with improvements in accordance with the invention.

In FIGS. 1 to 5, inclusive, I have shown a dozer equipped with improvements in accordance with the invention. The dozer, generally indicated by the numeral 40, may be entirely of a conventional type excepting for addition of sonic vibration means in accordance with the invention. Thus it may comprise a four-wheeled transport vehicle 41, equipped in the usual manner with push arms 42 projecting forwardly of the vehicle and carrying at their forward ends a concave dozer blade 43. The framework supporting blade 43 includes upright end walls 44 secured to the forward ends of push arms 42, as shown. Elastically vibratory bars 45 project downwardly and forwardly through suitable apertures in blade 43, being mounted at their midpoints in a mounting fixture 46 secured to the rearward side of the blade. In the illustrative design, the rearward half portions of the bars 45 are tubular in form, while the forward half portions thereof are of square cross-section, as illustrated. The juncture between the two may be at a shoulder 47, seen best in FIG. 5. The forward extremities 48 of the bars are beveled to an edge 49. The rearward ends of the bars carry sonic vibration generators 50, details of an illustrative form of which will be presently described. The bars are clamped at their midpoints by means of split, tapered collets 52, fitting in a tapered opening 53 in a mounting ring 54, screws 55 serving to draw the collet toward the ring 54 and thereby contract the collet to tightly engage the cylindrical portion 45a of the bar. Mounting ring 54 has a flange 56 abutting the rearward wall 57 of mounting fixture 46, and screws 58 passing through flange 56 and threaded into wall 57 complete the mounting of the bar.

The cylindrical half portion 45a of each bar, together with its vibration generator 50, are enclosed by a cylindrical casing 59, the forward end of which may have a flange 60 secured to the flange of mounting ring 54 as shown. Casing 59 is pressure-tight, and carries air under pressure for operation of generator 50. Air under pressure is introduced to the casing via a conduit 62 coupled into the head of casing 59 as at 63. The air pressure in casing 59 is moderate, not being over the order of 100 lbs. per square inch. The splits 52a in collet 52 are narrow, and effectively closed against leakage of air pressure when the collect is clamped tightly in place. However, to guard against possible leakage, a sealing O-ring 64 may be placed in the bottom of ring 54 below the lower end of the collet.

Air supply conduits 62 lead from a header 65 (FIG. 1) supplied with air under suitable pressure from an air compressor plant generally indicated by the numeral 66.

The vibration generator 50, in a preferred illustrative form, is shown in detail in FIGS. 3 and 4. A cylindrical casing 68, having an inturned head flange 69 at the top, snugly receives a body 70 having a circular head wall 71 at the top and a circular bottom wall 72 at the bottom, the peripheries of these walls being sealed to casing 50 as by O-ring seals as shown. Body 70 extends the full width of the casing 68 as seen in FIG. 4, but in the aspect of FIG. 3 is narrowed to form a bridge-like intermediate wall 70a, affording air chambers 73 on each side thereof as shown. A top wall 77 is mounted on flange 69, and screws 78 secure the parts in assembly.

Bridge wall 70a is formed with a pair of horizontally spaced horizontal bores 82 and side plates 83, secured to wall 72 as by screws 84, have cylindrical plugs 85 extending into bores 82 and pressure sealed therein as by means of O-ring seals, as shown. The inner ends of opposed plugs 85 are spaced, as shown, and disposed in the bores 82 with a close fit between the plugs 85 are hardened race rings 87. The cylindric chamber 90 inside each ring 87 contains a cylindrical inertia rotor 91, of a diameter preferably somewhat greater than the radius of the inner diameter of the ring 87, and of very slightly less width than the distance between opposed plugs 85. A plurality of air channels or grooves 92 are cut in opposite sides of each of rings 87, and these are directed tangentially to the chambers 90. These grooves act as air nozzles, introducing air under pressure to chambers 90 in tangential directions in a manner to drive rotors 91 orbitally about the inner periphery of rings 87.

The outer ends of nozzle grooves 92 are in communication with channels 95 formed in wall 72 around plugs 85. Pressure air is introduced to channels 95 via bores 96 extending upwardly therefrom through the upper end of body 70 to the chamber 97 inside casing flange 69 and under top plate 77. Air under pressure enters chamber 97 through slots 98 formed in casing flange 69. It will be recalled that the space around the generator contains pressure air, and this pressure air enters via the slots 98, and is led to and through nozzle grooves 92 into rotor chamber 90 as already described. Spent air leaves chamber 90 via ports 99 centrally located in plugs 85. This air thus passes to chambers 73, and thence flows through a transverse passage 100 in the bottom portion of wall 72 to a vertical passage 101 formed in a tubular stem 102 extending downwardly from body 70.

Stem 102 is tightly mounted in the upper end of cylindrical bar portion 45a, as shown. The lower portion of stem 101 has a taper-threaded portion 103 which is engaged with taper threads 104 formed in member 45a. Above threaded section 103 is a portion 105 of reduced diameter, at the top of which is a portion 106 of increased diameter snugly fitting in the entrance opening to tubular member 45a. In addition, the upper end of member 45a engages firmly under generator body 70. The juncture as thus described is firm and secure notwithstanding the vibratory action which it must undergo in service.

It will be observed that the nozzle grooves 92 are so directed as to introduce pressure air into chambers 90 with opposite directions of spin. The jets of air issuing from grooves 92 spin circularly about the chambers 90, and, impinging on the rotors 91, drive them in opposite directions at a relatively high spin frequency in orbital paths guided by the inner surfaces of race rings 87.

Exhaust air may be discharged from the vibration generator in various ways, but preferably, the discharge from the hollow generator stem is conducted through the hollow bar 45 to a discharge orifice 109 in the beveled extremity 48 of the bar. The air jet issuing from this discharge orifice acts to stir up and blow away from the point of attack earthen material loosened by the bar.

Sonic wave generators of this general class are disclosed in my Patent No. 2,960,314. The operation thereof will, however, be briefly explained herein. In general, pressure fluid introduced into the two inertia rotor chambers 90 causes orbital motion of the two inertia rotors 91, each of which exerts a centrifugal force on its corresponding race ring 87. The rotating force vectors so exerted on the race rings are of course transmitted to the body 70, and thence to the longitudinal bars 45.

The rotors automatically synchronize with one another. There are at least two principal possibilities. The rotors may become synchronized so that their components of motion longitudinally of bars 45 are in step with one another, with their lateral components of motion always equal and opposite to one another, or so that their components of motion laterally of the bars are in step with one another, with their longitudinal components of motion equal and opposite to one another. In the first case, longitudinally directed components of force exerted by the rotors on the race rings are additive, while lateral components are equal and opposed, and cancel; and in the second case (which is the preferred case in this instance), laterally directed components of force exerted by the rotors on the race rings are additive, while longitudinally directed components are equal and opposed, and cancel.

Synchronization of the rotors in either case results from their being connected through the generator body 70 with the elastically vibratory bar 45, the two rotors tending to synchronize with resonant elastic vibratory movements of said bar, and therefore with each other. If the bar 45 is vibrating in a longitudinal, half-wave-length resonant standing wave mode (case 1), the rotors, spinning oppositely, move vertically in step with one another, and laterally in opposition to one another, giving a resultant oscillating force impulse in a direction longitudinally of the bar. If bar 45, on the other hand, vibrates in a lateral resonant standing wave mode (case 2), of one full wave length, for example, the oppositely spinning rotors move laterally in step with one another, and longitudinally in opposition to one another, giving a resultant oscillating force impulse lateral of the bar.

Figure 2:
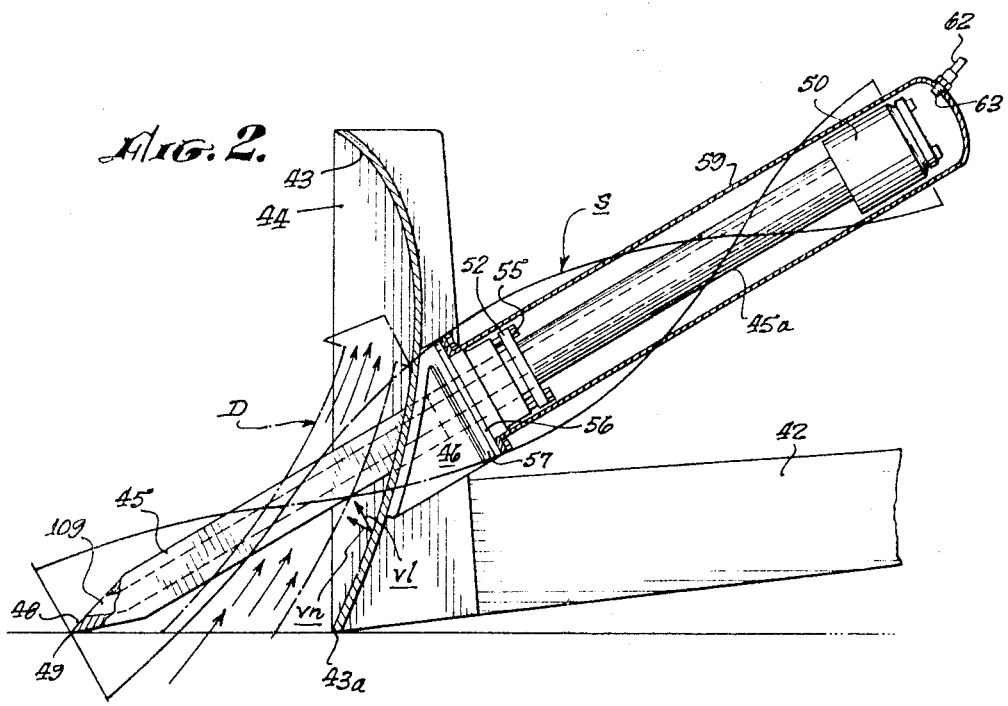
FIG. 2 is a vertical longitudinal section taken through the blade and sonic vibratory bars of the embodiment of FIG. 1.

Therefore, for case 2, the pressure of air delivered to the generator is regulated until the generators 112 are driven at a sonic spin frequency approximating a lateral resonant standing wave frequency of the bars 45, setting up a strong full-wave lateral standing wave along the bars, as designated by reference character $s$ in FIG. 2. In this action, the ends and the mid-portions of the bars are the locations of velocity antinodes of the bars, with nodes located therebetween, as illustrated. The resulting elastically vibratory motion of the tip end portions of the bars is suited to the loosening, disintegration, and sonic actuation of various kinds of earth material. The extremities of the bars engage and pick at the earth material, loosening it from its natural condition of adhesion to the earth.

The mid-portions of the bars being fixed to the back of the blade 43, and being the locations of velocity antinodes of the lateral waves in the bars, a vibratory impulse laterally of each bar is exerted on the blade, and the blade is thereby set into vibration. This vibration of the blade may be more or less bodily, or may partake of elastic deformation wave character. This is to say, while the principal resonant wave action may be in the bars 45, a considerable degree of vibratory wave pattern, of an elastic deformation vibration type, can be set up in the blade. This vibration, whether exclusively bodily, exclusively elastic deformation wave pattern type, or mixed, typically produces vibration of the blade in a direction laterally of the bar, as represented by the vector $vl$ in FIG. 2, with a component $vn$ normal to the blade 43, and normal also to the later mentioned dynamic earth flow path which extends upwards of the face of the blade. The sonic frequency at which the bars are vibrated by the sonic generators can vary within considerable limits, and of course depends upon the scale, geometry and modulus of the elasticity of the bars. Practically speaking, though without limitation, the sonic frequency will typically be in a range from a little less than a hundred to perhaps a few thousand cycles per second. Still higher frequencies, however, could be usefully used in the blade.

The blade 43, thus undergoing sonic vibration normally to its surface, derived as explained from the bars 45, and as represented typically by the vector $vn$, is pushed forward by the dozer, so as to encounter the earth material which is to be loosened and/or moved. The bars 45 have the picking and loosening action described earlier. The blade, vibrating laterally of the bars, and with a component of vibration such as represented by $vn$, radiates sonic action into and through the earth material which has accumulated against it. Typically, a layer of dirt moves up and across the blade, and then, in effect, a further layer is thereupon forced to climb up the first layer, with dirt-to-dirt friction therebetween. More dirt then rides up the second layer, and so on. The dirt at the surface of the blade does not of course become completely static, but tends in that direction. The most dynamic and low resistance earth flow action is ideally desired in a forwardly spaced region or path which I refer to as the dynamic earth flow region of the invention, and which is designated very generally by the large arrow D in FIG. 2. This earth flow region or path D is generally parallel to the blade, and spaced somewhat from the blade. Within this region, owing to dirt-on-dirt frictions, it is in general most difficult to establish a condition of free-flowing earth, and the invention is directed to the minimization of these frictions. It will of course be understood that there does not exist, in fact, a sharply delineated path region such as represented by the precise outline of the arrow D in the drawings, and that on the other hand, some earth flow will generally occur immediately adjacent the blade even after a full load of dirt has been accumulated in front of the blade. In a general way, however, the arrow D in the drawing is intended to represent the region wherein dirt-to-dirt frictions are importantly responsible for ultimate resistance to earth movement by the dozer blade, and wherein reduction of these frictions greatly facilitates and improves the operation of a dozer.

It will be seen that the vector $vn$, representing the amplitude of vibration of the blade in a direction normal to the blade surface, is also directed normally to the represented component of earth flow in the dynamic earth flow region D. The vibratory blade 43, vibrating with the component $vn$ as a consequence of its mounting at the velocity antinode of the laterally vibrating bars 45, becomes a source of sonic vibrations, which is automatically acoustically coupled to the earth material crowded up onto its surface, and which radiates acoustic vibrations into this earth material and causes the same to be propagated through the earth material in a direction transversely across the earth flow region D where a substantial portion of the dynamic earth flow tends to occur, and where dirt-to-dirt frictions tend to be high. The earth material in the region D, as well as, of course, between the outlines of the arrow D and the blade, and for some distance outside said arrow, is thereby set into sonic vibration, with high acceleration, and resulting agitation, fluidization, and almost a "boiling" effect, the loosened earth material running almost like a fluid under the sonic activation described. The advantage is marked and most unique in the flow region within the moving body of earth material and represented generally by the arrow D, for reasons already stated. The sonic vibration, however, also very desirably reduces the friction between the surface of the blade and the dirt sliding thereover. Attention is particularly directed to the fact that the sonic wave vibration delivered from the blade propagates through the earth material in a direction transversely across the earth flow region represented by the arrow D, thereby vibrating individual earth particles transversely to their flow direction, so as to reduce compaction and thereby promote freedom of flow.

A further optional but advantageous feature of the invention, as illustrated in FIG. 1, is a vibration of the blade 43 by sonic transmission in a direction parallel to its scraping edge 43a. For this purpose, I mount vibration generators 112 on the blade, or as here shown, on the end plates 44 secured to the blades, these generators, of which there may be one on each end plate 44, being adapted to exert alternating forces along direction lines parallel to blade edge 43a. These generators may be of any type suitable to the purpose, and may illustratively be of the same general nature of the generators 50 heretofore described. As shown, the generators are supplied with air under pressure through conduits such as 113 leading from header 165. The generators 112 may operate simply to vibrate the blade 43 bodily along a direction line parallel to the scraping edge 43a, thus causing the latter to have a slicing action on the earth material as it moves against it. A better cut is thereby taken. I may also operate the generators 112 in a manner to set up a half wave longitudinal standing wave in the blade 43. In such case, the central area of the blade remains substantially stationary, but the two half portions thereof on either side of center alternately elastically lengthen and contract with high acceleration, such action again, of course, taking place parallel to scraping edge 43a. The increased accelerations so obtained improve the shearing action of the blade on the earth material encountered by edge 43a. No problem is encountered as regards synchronization of the two generators mounted on the two ends of the blade, this occurring automatically as the vibratory action develops in the blade.

In FIGS. 6 and 7 is shown an application of the invention to a dipper shovel. A dipper shovel of conventional nature is diagrammatically indicated at 145, and is of a type having crawler unit 146, turntable 147, and revolving superstructure 148 including cab 149. Boom 150 is pivotally mounted at 151 on suitable support brackets carried by the deck of superstructure 148, and supports the usual stick 152 extending upwardly and rearwardly from bucket 153. The bucket 153 comprises a shell of more or less conventional structure, including bottom wall 155 terminating in earth engaging lip 155a, to which is added elastically vibratory bars 154 mounted at their midpoints on said bottom wall 155.

The bars 154 are toothed or beveled at their forward extremities 154a which project forwardly of wall 155, and mount sonic wave or vibration generators 156 at their rearward ends, as shown. Mounting fixtures 157 secure the midpoints of the bars rigidly to bucket wall 155.

The sonic generators 156 set up sonic standing waves in the bar 154. These generators may be operated at different frequencies to accomplish different performances. For example, they may be operated at a frequency approximating the resonant standing wave frequency for a longitudinal half-wavelength standing wave in the bars. Owing to the particular type of generator employed, in this case, as will later appear, there is also produced, in this case, a lateral vibration of the bars, and such lateral vibration imparts lateral vibration to the bottom wall 155 of the bucket, which in turn radiates sonic waves upwards into the bucket, so as to be propagated transversely across the later more particularly defined dynamic earth flow path or region F.

The sonic generators 156 may also, and for present purposes preferably, be operated at a frequency approximately the resonant standing wave frequency for lateral, rather than longitudinal, elastic standing waves in the bars 154. A typical lateral standing wave $sl$ is designated in FIG. 7, and is of one full wavelength, with velocity antinodes at the extremities of the bars and at the midpoints. Accordingly, the mid-points of the bars, where the standing wave amplitude is maximized because of the antinode, and where attachment is made to the bottom wall of the bucket, causes the bottom wall of the bucket to vibrate laterally, as indicated by vector $vl$ in FIG. 7. A component $vlc$ of this vector is directed normally to the general direction of the principal dynamic earth flow path or region represented by the arrow F. This arrow F is generally representative of the earth flow path, the same as described in connection with arrow D in FIG. 2, wherein large dynamic flow is desired but is interfered with, normally, or in the past, by dirt-on-dirt frictions. As in FIG. 2, the laterally vibratory wall, 155 in this case, radiates sound wave vibrations, in the direction of vector $vlc$, through the earth material and transversely across the dynamic earth flow region F. As in FIG. 2, the sonic vibration transversely of the earth flow path loosens the dirt, prevents compaction, and promotes freedom of flow, actually activating the soil into a fluidized condition wherein it flows with great freedom. Filling of the bucket is thereby very greatly facilitated. The lateral vibratory motion of the bar-tips in engagement with the earth material to be loaded, resulting from the location of an antinode of a lateral standing wave at said tip, loosens and frees the earth mass preliminary to its being engaged by the bucket. The bucket is then moved forwardly against this preliminarily loosened or "picked" earth, and the lip or entrance edge of the bottom wall of the bucket takes a bite of the earth material. The bucket is then pushed further forward, and the earth moves into the bucket, first forming a layer on the bottom of the bucket, and then climbing and building up on this layer. Large frictions of dirt-on-dirt are normally encountered in such a process, wherein the earth material flows largely as represented by the arrow F, and loading (forward movement of the bucket) is retarded or resisted by the frictions in the flow region F. The sonic vibrations directed and transmitted within and across the flow region F, however, substantially reduce these frictions, and cause the earth material to flow in said region with greatly promoted ease. These sonic vibrations, oriented with a substantial directional component across the flow path F, are of good power with strong lateral standing waves in the bars 45.

A suitable vibration generator for the bucket of FIGS. 6 and 7 is shown in FIGS. 8–10. As there shown, the rearward end of each bar 154 is formed with a cylindric housing portion 160, into which is tightly fitted a ring 161 which defines the outer periphery of a rotary chamber 162. Fitted tightly in the two ends of rings 161 are side plates 163, the inner surfaces of which define the sides of the aforementioned chamber 162. An axle shaft 164 is set axially into side plates 163, and surrounding said shaft 164 is the hub 165 of a bladed air-driven impeller or turbine wheel 166. The latter has a medial, circular wall 167 extending radially from hub 165, and wall 167 is formed on opposite sides thereof with angularly disposed turbine blades 168 adapted to be impinged upon by presently described air jets. Hub 165 is of substantially greater inside diameter than the exterior diameter of shaft 164, being nearly twice the diameter of the latter as shown in the illustrative embodiment.

Air under pressure is jetted tangentially into chamber 162, so as to impinge on turbine blades 168, via nozzle passages 170 formed in side plates 163. Spent air is exhausted through ports 169. The passages 170 lead inwardly of plates 163 from the outer peripheries thereof, so as to open through the inside surfaces of plates 163 in directions tangentially of chamber 162, and against turbine blades 168. The outer ends of passages 170 communicate with circumferential grooves 171 formed inside ring 161, and said grooves 171 communicate via ports 172 in ring 161 with a pair of air passages 173 extending longitudinally through the rearward half of bar 154 to substantially the midpoint of the latter. There, the passages 173 communicate with a passage 174 registering with a passage 175 in bar mounting fixture 167, the outer end of passage 175 having coupled thereto an air supply conduit 176 leading from an air compressor plant 177 mounted on the superstructure of the shovel, forwardly of cab 149. The conduits 176 may be suitably guided up the stick 152 to boom 150, and thence downwardly to the compressor plant, in any suitable fashion, for instance as indicated in FIG. 6.

The air driven turbine wheel 166 comprises, in effect, an inertia ring which, when driven by the jets of air issuing from nozzle passages 170, spins in chamber 162, with a gyratory motion about axle shaft 164. Vibration generators of this general type are disclosed in my aforesaid Patent No. 2,960,314. Suffice it to say here that the gyrating rotor 167 exerts a centrifugal force on axle shaft 164, and therefore on side plates 163 and housing 160. The resulting rotating force vector has a component of alternating force longitudinally of the bar 154, and a component of alternating force horizontally or laterally of the bar. The resultant motion of housing 160, and of points along the bar, is circular, or gyratory, when resonant frequencies of the bar are not approached. As the resonant frequency for a longitudinal standing wave in the bar is approached, the motion path becomes more and more elliptical, with the long axis thereof longitudinal of the bar, and finally, at resonance, becomes a comparatively flat ellipse, or may be nearly or substantially a straight line for a high Q system. Q will of course be understood to be a figure of merit in vibratory systems denoting the ratio of energy stored to energy dissipated per half cycle, and is somewhat analogous to flywheel effect in rotary systems. The higher the Q, the sharper or more peaked is the resonance curve. On the other hand, as a resonant frequency for a lateral standing wave is approached, the motion path again becomes elliptical, and then approaches a straight line; but in this case the extension of the ellipse, or straight line, is transversely of the bar. It can be seen that operation near but not exactly at the resonant frequency for a longitudinal standing wave permits or provides a substantial lateral wave component, resulting in radiation of sonic vibrations from the bottom of the bucket transversely across the flow path F. This effect may also be obtained if the system is of low Q, so as not to tune too sharply at resonance. Operation of the resonant frequency for a lateral standing wave in the bars results in a more powerful lateral wave action or vibration of the bucket bottom. The lateral vibration of the bucket bottom can be bodily, or depending upon wave frequencies, scale and geometry of parts, can involve elastic wave patterns. Running the frequency of vibration up or down easily locates the frequencies for these patterns, in which the sonic vibration of the bucket bottom is of an elastic deformation wave type. All these types of lateral vibration of the bucket bottom result in the transmission of sonic vibrations in the earth material in a direction across the "dynamic flow region" of the bucket, some with considerably more effect than others, but all with the effect of promoting freedom of earth flow, and ease of loading.

Reference is next directed to FIGS. 11 to 21, showing an application of the invention to a known commercial scraper, by which sonic vibrations are radiated and transmitted into and through an earth flow region of the scraper bowl, and the scraper blade means is also vibrated against the earth. The scraper here shown for illustrative purposes is of a type which is familiar to those skilled in the art, and need not be explained in minute detail. It has a two-wheeled, engine-powered tractor 200, to which is pivotally coupled, on a vertical pivot axis A–A′, the common, gooseneck fixture 202 supporting a yoke 203 whose arms 204 are pivotally connected, as at 205, to the side walls 206 of the scraper bowl 207. Side walls 206 are joined to frame structure 208 supported on the axles for rearward wheels 209 and this frame structure supports an engine, fragmentarily indicated at 210 in FIG. 20 (see also FIG. 11) which serves as a source of take-off power for purposes to be mentioned. Engine 210 controlled in a conventional manner from the operator's position in tractor 200. A horizontal transverse beam, not shown, but of usual nature extends transversely across between the front ends of the bowl side walls 206, and the whole bowl is suspended at the front by links 212 understood as connected to this beam. Conventional elevating mechanism 213 is mounted on goose-neck fixture 202 and connected to the upper ends of the links 212, and is operable to swing the bowl between an operative scraping position, as shown in the drawings, and an inoperative elevated position (not shown) which is occupied during transportation. The front of the bowl and the front part of the bowl floor comprise a conventional retractable "apron," so-called, not shown in these figures, but familiar to those skilled in the art, and not necessary to illustrate herein. It will be understood that this apron is adapted for elevation to permit unloading of the bowl.

The rearward half of the bowl floor and the rearward part of the bowl are embodied in a dirt-receiving shell, commonly and hereinafter called an ejector 218, which in this embodiment comprises a double-walled structure including a first normally horizontal portion 218a, a nearly vertical but somewhat rearwardly sloping back portion 218b, and an intermediate curving portion 218c. The ejector or shell may be completed by side walls 218d. The ejector is hinged at its front end, by means of a piano-hinge 219, to a transverse cutter board assembly 220. The latter is rigidly mounted at its ends to the side walls 206 of the bowl, and includes a board or plate 221 extending transversely between and below side walls 206 and having an outer face 221a (FIG. 14) which is disposed at the desired cutter angle relative to the ground surface. The plate 221 will be understood to be secured at opposite ends to side walls 206. In the normal working position, shown in FIG. 12, the upper edge portion of the back of the ejector rests against the upper of a pair of transverse upper and lower horizontal frame beams 222a and 222b. From this position, the ejector can be swung upwards on hinge 219, by conventional means, and shown, to dump the load. The apron may be lifted first, and then the ejector.

A transverse horizontal beam 223, of good elastic material, such as steel, and of rectangular cross section, is angularly mounted on and just outside the angular face 221a of board 221, and its opposite faces have the same angle as face 221a. This beam 223 is shortly spaced at its ends from opposite side walls 206 of the bowl. Its upper longitudinal edge 224 (FIG. 12) has an important sonic vibration radiation property, as will be disclosed more particularly hereinafter. In operation, a lateral resonant elastic standing wave, preferably of one wave length, is set up in beam 223, as represented at st in FIG. 13, and this wave has nodes at quarter wavelength distances from the ends of the beam. The beam is therefore mounted onto fixed plate or board 221 at, or near these nodes. To this end, the beam is formed with holes 226 at, or near, the nodes, and in some cases spaced somewhat from the nodes, and is mounted to board 221 by means of mounting pins 227 passing through said holes, preferably with clearance, as indicated. Pins 227 have partially cut-away heads 227a which engage over the top of the beam 223 (FIGS. 13 and 14). Washers 228 space the beam 223 from board face 221a at the nodes.

Cutter teeth 230 are mounted on the outer, angular face of beam 223. As here shown, they are mounted each by a single bolt 231 passing through the beam 223, with a washer 232a spacing each tooth from the beam. To further position the tooth, pins 232 projecting forwardly from the beam 223 engage in holes 233 formed in lugs 234 on the undersides of the teeth. The teeth 230 may be of different lengths, as in conventional scrapers. As here shown (FIG. 13), the teeth 230 in the middle are longer than those near the edges of the bowl.

To set the beam 223 into its pattern of lateral standing wave vibration, its opposite ends are connected by links 240 and 241 to opposite ends of an upper, somewhat similar, elastically vibratory beam 242 (FIGS. 12 and 13) also composed preferably of a good grade of steel, of good elastic fatigue properties, and also rectangular in cross section, and of substantially the same length as beam 223. The side faces of the two beams 223 and 242 are in parallel planes and are symmetrical relative to a medial angular plane which is parallel to the plane of the teeth 230, as will be clear from FIG. 12. This beam 242 is adapted to be set into a lateral mode of elastic resonant standing wave vibration, usually of one full wavelength, and of the same character as the standing wave st to be set up in the beam 223. The wave for beam 242 is represented diagrammatically at st' in FIGS. 13 and 18. It will be seen to have nodes at one quarter of its length from each end, and intervening antinodes.

The beam 242 generally and somewhat closely overlies the transverse horizontal frame beam 222a, and two pads 245 mounted thereon at the locations of the nodes in the beam are used for the support of beam 242. The beam 242 has transverse holes 246 through it at the nodes of its standing wave, i.e., one quarter of its length from each end, and engaging in these holes from the under side are sleeves 247 (FIG. 16) which are welded to the two coplanar end portions 248a of a motor support plate 248 (see also FIG. 17). A washer 249 is used between pad 245 and plate 248, and another washer 250 between plate 248 and the underside of beam 242. Beam 242 is held down by a screw 252 which, as shown, threads into mounting pad 245, and engages a washer 253 placed on top of the beam over hole 246. The beam is thus mounted to a stationary part of the frame structure at the two stationary nodal points of its standing wave.

The beam 242 is excited and driven in its said standing wave mode of elastic vibration by means of a gyratory type of vibration generator or oscillator 260 clamped to the mid-point of the beam. Several illustrative forms of a suitable oscillator were shown in my earlier application Serial No. 181,385 filed March 21, 1962, entitled Vibration Generator for Resonant Loads and Systems Embodying Same.

The oscillator 260, as here shown, comprises a rectangular housing block 261, two circular thrust plates 262 and 263 engaging opposite sides of housing 261, and two circular cover plates 264 and 265 engaging over thrust plates 262 and 263, respectively, the parts being held in assembly by through bolts 266. Housing block 261 has a transverse bore 267, in which are tightly seated a pair of hardened, laterally spaced, steel, cylindrical race rings 268. Tightly clamped between these race rings 268 is an internal gear 269, and meshing with the latter is a spur planet gear 270 situated in a medial position on a gear sleeve 271 that extends between thrust plates 262 and 263, but is freely rotatable relatively thereto. The pitch circle of the internal gear 269 coincides with the inside cylindrical surface of race rings 268.

Gear sleeve 269 has on the inside thereof, in a medial position, splines 274 which are in mesh with arcuate splines 275 on a ball 276 which is on one extremity of a conically gyratory drive shaft 277. This drive shaft is driven at its opposite extremity by means of arcuate splines 278 in engagement with internal splines 279 in a cup-fitting 280 mounted on the extremity of the drive shaft of a drive motor 281. These splines form a universal joint 282 as will be seen. In this instance, motor 281 is a fluid motor.

Ball 276 is nested and universally movable between two internally cylindrical ball seats 283 and 284, the former of which is tightly seated inside sleeve 269, and the latter of which is removably seated therein, and held in position by a snap ring, as indicated. Rotatably mounted on sleeve 269, on opposite sides of gear 270, are two heavy inertia rings or rollers 288 which bear on the inside faces of the race rings 268. The rollers 288 have the same diameter as the pitch circle of the planet gear 270.

The inertia rollers 288 are guided to maintain the planet spur gear 270 in proper mesh with internal gear 269, and so that the inertia rollers 288 roll, in orbital motion, around the insides of the raceway rings 268, the surfaces of the inertia rings being pressed by centrifugal force against the inside surfaces of the rings 268. To accomplish this guiding function, the seat member 283 is formed with an axial pin 292, which rides around a guide pin 293 set into thrust plate 262, on the central axis thereof, and projecting into overlapping relationship with the pin 292. The teeth of gear 270 may by this means be held in mesh with the internal gear 269 when the oscillator is at rest, or is coming up to speed. When the oscillator is up to speed, the rollers 288 press firmly against the raceway ring 268 by virtue of centrifugal force, and the gears remain in proper mesh without further aid from the two guide pins 292 and 293.

The conically gyratory shaft 277 is housed by a housing tube 296 set into an opening in end cover plates 265 at one of its ends, and fitted into an aperture 297 in a motor adapter 298 at the other end. The motor adapter 298 is secured, as by screws 299 (FIG. 17), to the central laterally offset portion 248b of the aforementioned motor mounting plate 248, and to the opposite end of the motor adapter 298 is secured the aforementioned hydraulic motor 281. The extremity of the drive shaft 300 of this motor 281 is shown to be coupled by the flange universal joint 282 previously described to the corresponding end of drive shaft 277. Engine 210 has a conventional power take-off means at 305, to which is coupled a hydraulic pump 306. The outlet of pump 306 is connected by pipe line 307 to the inlet of hydraulic motor 281 (FIGS. 17 and 19), and the outlet from motor 281 is connected by ppe 308 to a reservoir 309, the latter having also a return line 310 leading to the intake for pump 306. Oscillator 260 is thus driven through the fluid link comprised of pump 306 and fluid motor 281 from engine 210, and oscillator output frequency is accordingly controllable by the throttle of the engine 210.

The oscillator 260 is clamped to the midportion of beam 242 in the following manner: the oscillator housing block 261 engages the upper edge of beam 242 at the midpoint of the beam, and is clamped in place by a pair of clamp blocks 315 engaging the opposite side of housing block 261, a pair of clamp blocks 316 engaging the lowermost edge of beam 242, in line with blocks 315, and interconnecting clamp bolts 317. Box 315 preferably has depending extension 315a formed with slots 318 which receive the medial portion of motor mounting plate 248, a ball 319 preferably being seated within the slot 318 to engage motor mounting plate 248 for support of the latter and the parts mounted thereon. As will appear, the ball support provided permits movement of the oscillator 260 and beam 242 in the plane of gyratory vibrator movement set up by the oscillator without interfering with the support of plate 248 by the ball 319.

The operation of the oscillator 260 is as follows: shaft 277 is rotated through universal joint 282 from the shaft of hydraulic motor 281. The arcuate splines 275 on the ball end of shaft 277, in mesh with the splines 274 inside planet gear 270, and the arcuate splines 279 on the other end of shaft 277, in mesh with the splines formed inside cup 280, cause these parts to act as universal joints, and permit the shaft 277 to move in a conical gyratory fashion as the operation proceeds. Rotation of the shaft causes planet gear 270 to roll about the internal gear 269 in what may be described as a planetating or orbital path. The inertia rings 288 on gear sleeve 271 at this time roll on the inside race ring surface of race rings 268, and when operating speed has been attained, tend to do so without material skid. The inertia rings 288, however, are capable of any necessary degree of rotation on the gear sleeve 271. In operation, therefore, the planetary gear 275 rolls orbitally about the stationary internal gear 269, and the inertia rings 288 correspondingly roll about the surfaces of raceway rings 268; and when the device is up to speed, little if any slippage occurs between the inertia rotor rings 288 and the raceway rings 268, but some minor relative rotation may occur between the inertia rings 288 and the gear sleeve 271. This arrangement desirably places the bearing stress of the inertia rings against the hardened race rings 268 and at the same time relieves the gear teeth of such stress, also permitting a degree of relative rotation between the inertia rings and the gear 270 so as to avoid the exertion of undue torque on the gear teeth.

In the operation described, the inertia rollers 288 rolling in an orbital path around the insides of the bearing rings 268 develop a centrifugal force which is exerted on the latter, creating a force vector which rotates about the central longitudinal axis of the raceway rings 268. Thus a gyratory force is exerted on the oscillator housing body 261, and in turn on the medial portion of the bar 242 against which the body 261 of the oscillator is firmly clamped. Thus a gyratory force is exerted against a lateral edge of the beam 42 at a point midway of the length of said beam. Assuming this gyratory force to be regulated to occur at a cyclic frequency which is equal to or approximately that of the resonance frequency of the beam 242 for a lateral mode of standing wave vibration in the beam 242, a lateral standing wave or standing wave vibration is thereby set up in the beam. Components of the gyratory force exerted on the beam which are in the direction of the length of the beam are ineffective to produce material vibration longitudinally of the beam, both because of lack of a resonant frequency for longitudinal waves, and because of application of this force at a point inappropriate for longitudinal resonant standing wave action. The standing wave set up in beam 242 has already been referred to and represented in FIG. 18 at st'. This standing wave or standing wave pattern will be observed to be of one full wavelength, and be characterized by velocity antinodes v, i.e., regions of maximum vibration amplitude, at the midpoint of the bar and at the extremities thereof, and velocity nodes n, i.e., regions of minimized or zero vibration amplitude, at the quarterwave length points along the bar.

Accordingly, the action in the bar is that the two extremities thereof vibrate elastically along the direction line represented by the double-headed arrow 320 in FIGS. 13 and 18. It will be seen that this vibration has been accomplished by the application to said beam of a rotating force vector, turning about an axis normal to the beam 242, at an antinodal region of the beam for a lateral mode of standing wave vibration.

This vibratory motion of the extremities of the elastically vibratory bar 242 is transmitted to the extremities of the elastic bar 223, by the aforementioned interconnecting links 240, which, as earlier described, rigidly link the extremities or extremity velocity antinode regions or the two bars 223 and 242. Vibratory drive is thus transmitted to the lower bar 223 and the latter is excited to exhibit elastic lateral standing wave vibration. To this end, of course, the two bars 242 and 223 are fabricated to have lateral resonant frequencies which correspond closely to one another. Thus the standing wave st mentioned heretofore (see FIG. 13), is set up in the lower, tooth-carrying bar 222. The wave st, like that for the bar 242, has velocity antinodes v at the midpoint and at each end, and nodes n at quarterwave length distances from the extremities. The standing wave vibration of bar 223 is thus in correspondence in all respects with the standing wave vibration in the driving bar 242. The teeth 230 mounted on the bar 223 vibrate against the earth material being severed or broken away and scraped, in accordance with the standing wave pattern represented at st. As will be seen, the amplitudes of vibratory motion of the teeth will vary along the row of teeth in accordances with the envelope of the standing wave pattern st.

In operation, the scraper bowl 207 is lowered until the teeth 230 are in engagement with the earth to be removed, and the vehicle is driven forwardly by its tractor 200, as usual, the teeth being set to take a depth of cut as desired. The teeth are thus pressed firmly into engagement with the earth, i.e., with a considerable biasing pressure. At the same time, the engine driving the oscillator 260 is running, and is speed regulated, as by the usual engine throttle, to drive the oscillator at the lateral resonant frequency of the bar or beam 242. This sets up the vibratory motion of the teeth 230, as mentioned above. The teeth 230 are thus firmly acoustically coupled to the earth, and vibrate thereagainst so as to both cut and dig the earth material, and also, to radiate sonic waves into and through the earth material. By both vibratory cutting, and in the event of material rock content, failure from elastic fatigue, the earth material rapidly breaks free; and by reason of the effects of the radiation of sonic vibration, the earth material is further agitated and broken up, disintegrated, loosened, and generally "fluidized," so as to run freely up the advancing blade constituted of the multiplicity of teeth 230. This climbing earth material flows over the vibrating bar 223, whose action keeps it agitated and free, and then moves on behind the rearwardly and upwardly facing edge 224 of the bar 223 and on over the entrance edge 218' of the ejector 218 into the pocket thereof. As will be clear, the earth flows down over the rearwardly and upwardly facing edge 224, and is thus subjected to the sonic wave or vibratory action exhibited by the rearward edge 224 of the bar 223. The earth material packs tightly enough against edge 224 as it flows over and past to afford an effective sonic coupling from the bar to the earth material, and sonic vibrations are thus transmitted into this earth material which as flowed over the front face of bar 223 and is then flowing over or beyond bar edge 224 and into ejector 218. The earth flow path or region determined by the geometry of the apparatus is generally as represented by the arrows 322 in FIG. 12, and it will be clear that, as in earlier described forms of the invention, a component of vibratory motion, such as represented at 323 in FIG. 12, is set up in the earth material or mass moving along the earth flow path 322, with the dirt-on-dirt friction-reducing effect previously described. Loading of the earth material into the pocket of the ejector is thus greatly facilitated. The earth material is not only severed more easily from the earth, and moved more easily up the blade, but is moved and filled into the bowl, or ejector pocket, with very materially reduced friction, and consequently reduced effort. Also, in the event the mounting pins 227 for the vibratory bar 223 are located at some spacing distance, such as a few inches, from the nodes of the standing wave in the bar, as suggested hereinabove, strong vibration is transmitted from the bar through the pins 227 to the cutter board assembly and thence to the ejector, causing the bottom wall of the ejector to vibrate elastically with a component of motion parallel to the vibration of the bar 223. In this case, the ejector will be seen to be acoustically coupled to the bar 223. Such a varient is diagrammatically shown in FIG. 13a, where the bar is indicated at 223', and the mounting pins at 227', spaced longitudinally of the bar from the nodes $n$. The resulting vibration of the ejector wall couples and is transmitted into the dirt mass, and further promotes its flowability.

FIGS. 22 to 25 show a modification of the invention utilizing a vibration generator or oscillator, preferably of the type disclosed in connection with the embodiment of FIGS. 11 to 21, but here mounted directly to the back of the ejector. The scraper in this case will be understood to be generally of the same type as that illustrated in FIGS. 11 to 21. Parts thereof not shown in FIGS. 22 to 23 will be understood to be, for example, the same as those seen in the earlier embodiments. Thus, the common gooseneck fixture is indicated fragmentarily at 350, supporting yoke 351 whose arms 352 are pivotally connected, as at 353, to the side walls 354 of the scraper bowl 355. Sidewalls 354 are joined to frame structure 356 supported on the axles for rearward wheel 358, and this frame structure supports an engine 359.

A horizontal transverse beam 362 extends transversely across between the forward ends of the bowl sidewalls 354, and the whole bowl is supported at the front by links, not shown in FIGS. 22 to 25, but understood to be similar to those indicated at 212 in FIG. 1, and further understood to be provided with suitable elevating mechanism by which the bowl may be swung between an operative scraping position, as shown, and an inoperative elevated position, not shown, but which is occupied during transportation. The front of the bowl and the front part of the bowl floor comprise a conventional retractable apron 365. This apron 365 has a pair of projecting arms 366 lying just outside the sidewalls 354, and these arms are pivotally connected to the sidewalls 354 as at 367, whereby the apron 365 may be swung upwardly about the pivot 367, for unloading purposes. To accomplish such elevation of the apron, suitable means of a conventional nature are provided, not necessary here to show as they form no part of the present invention.

The rearward half of the bowl floor and the rearward part of the bowl are embodied in the aforementioned ejector, designated generally by numeral 370, similar to that shown and described in connection with the embodiment of FIGS. 11 to 21, and shaped to provide the rearward half of the bowl floor and the rearward part or back of the bowl in a usual manner. This ejector 370 is provided along its forward edge with a special form of piano hinge connection 372 to a cutter board assembly 374, mounting a usual cutter blade 375, and which is rigidly connected at its ends to the bowl sidewalls 354, in the usual fashion. The ejector is of the common double wall construction, and projecting from the forward edge portion thereof, are bracket arms 377 which surround and support a hinge pin 378. The latter runs longitudinally, with clearance, through a plurality of longitudinally spaced hinge cylinders 379 welded to cutter board assembly 374. Thus, a loose hinge is provided, by which the ejector 370 may be swung upwardly to discharge its load in the usual manner. When the ejector is in the position of FIG. 23, it is supported, by means presently to be described, in a position with the hinge pin 378 out of engagement with the hinge cylinders 379. Thus, the ejector is capable of vibratory action without interference between its hinge means and the cutter bowl assembly.

A steel spring bar 380 extends across underneath the ejector between sidewalls 354 of bowl 355, somewhat rearwardly of hinge 372, and this spring bar 380 supports somewhat inwardly from the two sides of the bowl, steel mounting seats 381 of semi-cylindrical form, which engage in corresponding cylindric grooves 382 formed in the underside of a pad 383 secured to the underside of the ejector. The support for the ejector thus afforded coacts with the presently described support to position the ejector hinge pin 378 in the center position illustrated in FIGS. 23 and 24, clear of the hinge cylinders 279. Further rearwardly, and somewhat up the back, the ejector 370 is furnished with support pads 384, somewhat similar to the pads 383, and these are engaged by steel semi-cylindrical supports 385 mounted on resilient blocks 386 supported in mounting cups 387. As indicated in FIG. 22, the ejector may be supported as described by two pads 383 and 384 on each side of the longitudinal center line of the apparatus, each such pad being supported in turn by a yieldable or spring cushioning means.

Conventional linkage, designated generally by number 390, and operated by a hydraulic jack 391, is utilized to raise the ejector on its hinge 372 from the position illustrated in the drawings to the dumping position, and this mechanism need not be described in further detail, forming no part of the prevent invention.

Secured to the back of ejector 370 is a preferably gyratory type of vibration generator or oscillator designated generally by the reference numeral 400. This oscillator is of the same nature as that designated generally at 260 in FIGS. 16, 19 and 20, and therefore need not be re-described. It contains inertia rollers indicated in FIG. 23 at 401, understood to be driven in an orbital path in circular raceway 402. As appears in FIG. 23, the horizontal axes of inertia rollers 401 and raceway 402 are horizontal, and transversely to the length of the scraper. The inertia rotors are driven through gears as described in connection with the earlier embodiment from a conically gyratory shaft, not shown in FIGS. 23 to 25, but understood to be contained within housing tube 404 (FIG. 22), and to be driven through means of the type illustrated in FIG. 16 from a fluid motor designated generally, in FIG. 22 as 405. Said motor 405 is driven from a fluid pump 406 and intervening fluid supply and return lines 407 and 408. Pump 406 is driven through shaft 410 from a transmission 411, and the latter is powered from vehicle engine 359 through drive shaft 412. A propeller shaft 413 leading from transmission 411 leads rearwardly to the vehicle differential 414 through which rearward wheels 358 are driven. The transmission 411 contains suitable gears, of conventional nature, not necessary here to illustrate, but of such drive ratio that when the vehicle is being powered to drive forwardly at normal speed for a scraping operation, the oscillator 400 will be driven at a resonant frequency for the ejector which is to be vibrated thereby.

The gyratory type vibration generator or oscillator 400 sets up a gyratory impulse, characterized by a rotating force vector, in the structure to which the housing of the oscillator is secured, which in this instance is the back portion of the ejector. Accordingly, the ejector is subjected to a corresponding gyratory force impulse. In effect, a rotating force vector is directed against the ejector at the point where the vibrator or oscillator 401 is mounted thereto. The ejector is made up of sheet steel, and constitutes a transmission medium for elastic sound wave vibrations set up therein by the vibratory action produced by the oscillator 400. In the case illustrated, the rotating force vector delivered by the oscillator to the ejector turns about a horizontal axis, but it will be clear that, in accordance with the teachings of FIGS. 11 to 21, the oscillator may alternately be oriented to deliver a rotating force vector turning about an axis normal to the axis here exemplified, e.g., about an axis in a vertical plane, but disposed parallel to the back of the ejector, for instance.

The oscillator 400 has been mounted, and acoustically coupled, to the ejector 370 in one corner region thereof. The ejector is set into a two dimensional resonant lateral standing wave pattern, or pattern of standing wave vibration, when operated at a resonant frequency thereof. The behavior is similar to well known resonant lateral standing wave vibration of an elastic plate. Such a pattern is characterized by a generally rectangular grid-work pattern of nodes and antinodes, with antinodes at the four corners. A corner region of the ejector is accordingly a suitable location for the excitation of the standing wave by the oscillator 400, and the oscillator has been so located in the present example. At individual antinodes, which are located at points spaced from one another in two directions throughout the surface of the ejector, the ejector exhibits a strong component of vibration normal to the surface of the ejector. With the gyratory type oscillator 400, there is also a component of vibration parallel to the surface of the ejector, though usually at reduced amplitude owing to lack of resonance for this component. The uppermost surface of the ejector constitutes a sonic or vibration wave coupling and radiation surface, and radiates sonic waves or vibrations into and through the dirt on the ejector, and transversely through the earth flow region represented in FIG. 23 by the arrows 410. This action occurs both at the nearly horizontal, lower or floor portion of the ejector, and at the nearly upright back part of the ejector, as well as the curved portion in between. The arrows x in FIG. 23 illustrate the components of vibration normal to the earth flow path. It will further be noted that the ejector has a surface (the front surface of its back) which is oriented somewhat normal to the flow path 410 where the latter is moving into the ejector and before it has been turned almost vertical by the ejector back, and that this portion of the ejector, vibrating normally to its said surface, radiates sonic vibrations into the earth material which are somewhat or generally aligned straight toward the direction of initial inflow of earth material into the ejector, and generally transverse of the portion of earth material finally guided upwardly by the ejector back. The gyratory type oscillator produces components vibration in the earth-engaging ejector wall which are parallel with or in the plane of said wall, and, by acoustic shear coupling to the dirt in contact therewith, laterally oriented shear type vibrations are also radiated through the dirt across the earth flow region. By these actions, frictions of dirt-on-dirt are greatly reduced, in the manner and with the benefits earlier described. The impedance considerations mentioned in the introductory part of this specification here apply, and need not be repeated. The improvements here described result in a highly beneficial agitation and loosening of the earth material in the important flow region of the bowl, roughly represented by the arrows 410, greatly enhanced fluidity of the earth material while being loaded, and correspondingly facilitated loading action.

FIGS. 26 to 28 show a modification of the embodiment of FIGS. 23 to 25. The scraper in this case is or may be, with exceptions to be noted, identical with that of FIGS. 23 to 25, and corresponding reference numerals are accordingly applied to corresponding components, but with the numerals primed in the case of FIGS. 26 to 28. A repetition of description of corresponding parts will not be necessary.

Referring to FIGS. 26–28 in detail, the frame structure in this case includes just behind the ejector 370', a transverse beam 450, of U-shaped cross-section, and received between the two sides thereof is a transverse elastic bar or beam 451, adapted to be set into a mode of resonant lateral elastic standing wave vibration. In the example here given, the standing wave mode is assumed to be of one full wavelength character, affording velocity antinodes at the extremities of the bar and at the midpoint, with nodes located one-quarter of the length of the bar inward from each of the extremities. Accordingly, these nodes are appropriate mounting points for the bar, and at each such node, the bar is shown to have a boss 452 perforated to receive a mounting pin 453 which is set into the two sides of the U-shaped beam 450, as illustrated.

Vibratory bar or beam 451 is set into its lateral standing wave vibration by means of a suitable vibration generator or oscillator 456, and this generator or oscillator 456 is again illustratively of the gyratory type explained hereinabove, and not necessary to illustrate and redescribe in detail. Suffice it to say that the oscillator has raceway 457 and orbital rotor 458, and the latter will be understood as driven through a shaft, not shown, but contained in tubular shaft housing 459 (FIG. 26), driven from hydraulic motor 460. In this case the turning axis of the rotating force vector delivered from the oscillator is again horizontal, as in FIG. 23, but it could be in a vertical plane, as in FIGS. 11–21. The fluid drive for the motor 460 is accomplished through suitable fluid supply and return lines from a fluid motor 461 driven through shaft 462 from transmission 463, the latter being powered through propeller shaft 464 leading from the engine 465. In operation, engine 465 is driven at such controlled speed as to operate through transmission 463, pump 461, and fluid motor 460 to drive generator 456 at a frequency corresponding to the resonant frequency of the elastic bar or beam 461 for a one wavelength mode of lateral standing wave vibration. The generators 456 will be seen to be mounted on bar 451 near one of its extremities, in an appropriate location for effective vibratory drive of the beam. A similar vibration generator, not shown, may also be mounted on the beam 451, in similar fashion, near its opposite extremity. The two generators self-synchronize through the vibratory bar 451 when the latter is driven at its resonant frequency, so that the bar is effectively driven by the two generators.

The back of the ejector has at each side a rearwardly projecting bracket 470, which is formed in its rearward edge portion with a notch 471 adapted to receive and engage tightly over the upper portion of the vibratory beam 451. As clearly appears in FIG. 26, the beam 451 is so engaged by brackets 470 near the extremities of the beam, so that the vibratory action of the beam at its end antinodes through the brackets 470 to the back of the ejector 370'. The vibration so transmitted to the ejector 370' again, as in the case of the embodiment of FIGS.

23 to 25, sets up in the ejector a two dimensional standing wave pattern consisting of nodes and antinodes, with components of vibratory motion laterally of the ejector, and these are effective on the dirt being loaded into the ejector in the same general manner as heretofore described in connection with FIGS. 23 to 25.

The embodiment of FIGS. 26 to 28 is shown to have a loose hinge arrangement 372', as described in connection with FIGS. 22–25, affording freedom for vibratory action of the front part of the ejector. The ejector is in this case provided, on the underside, near hinge 372', with supporting pads 472, formed on the underside thereof with V-notches 473. These V-notches are engaged by rollers 474 supported by the side walls of the 356' of the bowl. The ejector has a component of forward and rearward vibration by reason of the gyratory or rotating force vector delivered from the oscillator and transmitted to the bar 451 and thence to the ejector. Accordingly, the forwardly and rearwardly vibrating ejector, interacting through the V-notches 473 with the support rollers 474, is caused to vibrate vertically, i.e., transversely to the more or less horizontal lower surface of the ejector. This surface is sonically coupled to the dirt flowing over and above it, and sonic vibrations are thus transmitted to and through this dirt, thus affording a further sonic vibratory action which aids in fluidizing and promoting the flow of dirt into the bowl.

FIG. 29 shows a modification of the scraper of FIGS. 26 to 28 according to which the ejector, here designated by the reference numeral 370", is pivotally connected to the cutter board assembly 374" by means of a short pivoted link 480, instead of by the hinged means described in preceding embodiments. As will clearly appear in FIG. 29, the link 480 is pivotally connected to the back of cutter board assembly 374" and pivotally connected also to the forward end of the ejector 370". It thus permits upward swinging of the ejector for unloading purposes, and it also supports the ejector for vibratory action in a generally horizontal direction under the influence of the vibrational standing wave pattern set up in the ejector from the elastic beam 451" driven in a resonant, one wavelength lateral standing wave pattern, for instance, produced by the gyratory oscillator designated generally by numeral 456".

The invention has now been described in detail in connection with a substantial number of illustrative embodiments thereof. It will be understood that these are for the purpose of illustration only, and not limitation, and that numerous changes in design, structure and arrangement may be made without departing from the spirit and scope of the invention as defined in the appended claims.

I claim:
1. The combination comprising:
an earth moving machine or the like configured to afford an earth flow region;
an earth receiving and carrying shell in said machine having a bottom wall provided with a forward entrance edge, and a back wall;
a sonic resonant elastically vibrator member in the form of a horizontal elastic bar extending transversely of and generally adjacent the entrance edge of said bottom wall of said shell;
mounting means for said bar on said machine in the region of a nodal point of said bar for a mode of lateral resonant standing wave vibration of said bar, wherein said bar vibrates in a pattern of nodes and antinodes;
a sonic vibration generator operable at the frequency of said standing wave vibration of said bar acoustically coupled to said bar at an antinode of said standing wave vibration for setting said bar into said resonant vibration; and
said bar having a surface coupled to earth material flowing through said earth flow region in a path extending over said bar and entrance edge and adapted by virtue of its vibration to transmit vibration into said dirt traversing said path.

2. The subject matter of claim 1, wherein said sonic vibration generator is characterized by a rotating output force vector.

3. The subject matter of claim 1, including:
earth engaging blade means mounted forwardly of said bar and said entrance edge and coupled with said bar so as to be vibrated thereby against the earth engaged thereby.

4. The subject matter of claim 1, including:
an elastic vibratory driving bar parallel to said first mentioned bar, and of substantially the same resonant frequency for a mode of lateral standing wave vibration, characterized by nodes and antinodes;
means linking the extremities of said bars to one another; and
wherein said sonic vibration generator is coupled to an antinode of said vibratory driving bar.

5. The combination comprising:
an earth moving machine or the like configured to afford an earth flow region;
an earth receiving and carrying shell in said machine having a bottom wall provided with a forward entrance edge, and a back wall, said bottom wall having thereabove at least a portion of said earth flow region;
a sonic resonant elastically vibratory member comprising a horizontal elastic bar extending transversely of and generally adjacent the entrance edge of said bottom wall of said shell;
mounting means for said bar on said machine near to but spaced from a nodal point of said bar for a mode of lateral resonant standing wave vibration of said bar, wherein said bar vibrates in a pattern of nodes and antinodes;
a sonic vibration generator operable at the frequency of said standing wave vibration of said bar acoustically coupled to said bar at an antinode of said standing wave; and
means for forming an acoustic coupling between said mounting means for said bar and said bottom wall of said shell whereby sonic vibration is transmitted from said bar to said bottom wall of said shell and sets said bottom wall of said shell into elastic vibration, said bottom wall of said shell being in acoustic coupling relationship to earth material in said earth flow region.

References Cited by the Examiner

UNITED STATES PATENTS

| | | | |
|---|---|---|---|
| 833,761 | 10/1906 | Stevens | 214—64.2 |
| 2,228,445 | 1/1941 | De Velbiss. | |
| 2,443,492 | 6/1948 | Austin. | |
| 2,504,789 | 4/1950 | Bankauf | 214—64.2 |
| 2,554,005 | 5/1951 | Bodine. | |
| 2,613,582 | 10/1952 | Harshburger | 172—40 |
| 2,619,748 | 12/1952 | McIntosh. | |
| 2,654,586 | 10/1953 | Berry | 299—14 |
| 2,773,320 | 12/1956 | Fryer | 37—126 |
| 3,030,715 | 4/1962 | Bodine. | |
| 3,033,543 | 5/1962 | Bodine. | |

ANTONIO F. GUIDA, *Acting Primary Examiner.*

BENJAMIN HERSH, A. G. STONE, *Examiners.*

G. T. MOLLER, W. A. SMITH, *Assistant Examiners.*